(12) United States Patent
Varma et al.

(10) Patent No.: US 12,321,938 B2
(45) Date of Patent: Jun. 3, 2025

(54) SYSTEM AND METHOD FOR GENERATING AND PROVIDING USER-SPECIFIC TRANSACTION INTERFACE

(71) Applicant: Yahoo Assets LLC, Dulles, VA (US)

(72) Inventors: Nikita Varma, Milpitas, CA (US); Ashish K Dharamshi, Sunnyvale, CA (US); Gnanavel Shanmugam, San Jose, CA (US); Mohit Goenka, Santa Clara, CA (US)

(73) Assignee: Yahoo Assets LLC, New York, NY (US)

( * ) Notice: Subject to any disclaimer, the term of this patent is extended or adjusted under 35 U.S.C. 154(b) by 224 days.

(21) Appl. No.: 17/894,270

(22) Filed: Aug. 24, 2022

(65) Prior Publication Data
US 2024/0070667 A1 Feb. 29, 2024

(51) Int. Cl.
G06Q 30/00 (2023.01)
G06Q 20/38 (2012.01)
G06Q 20/40 (2012.01)

(52) U.S. Cl.
CPC ....... G06Q 20/4014 (2013.01); G06Q 20/387 (2013.01)

(58) Field of Classification Search
CPC ............. G06Q 20/4014; G06Q 20/387; G06Q 20/363; G06Q 30/0251
See application file for complete search history.

(56) References Cited

U.S. PATENT DOCUMENTS

| | | | | |
|---|---|---|---|---|
| 2008/0133349 A1* | 6/2008 | Nazer | ............... | G06Q 20/12 705/26.1 |
| 2013/0173369 A1* | 7/2013 | Krolick | ............. | G06Q 30/02 705/14.17 |
| 2013/0204697 A1* | 8/2013 | Boal | ................. | G06Q 10/00 705/14.51 |
| 2020/0211048 A1* | 7/2020 | Raviv | ........... | G06Q 30/0239 |

* cited by examiner

Primary Examiner — Meredith A Long
(74) Attorney, Agent, or Firm — Cooper Legal Group LLC

(57) ABSTRACT

One or more computing devices, systems, and/or methods for generating a user-specific transaction interface are provided. In an example, a datastore of a user may be searched for an indication of a potential transaction. The datastore may include an email mailbox and/or a record of web browsing. In response to identifying the potential transaction, the datastore of the user, a partnership datastore and/or a network may be searched for an opportunity associated with the potential transaction. In response to identifying the opportunity associated with the potential transaction, a user-specific transaction interface may be generated. The user-specific transaction interface may include one or more selectable inputs for engaging in a version of the potential transaction. The user-specific transaction interface may be provided for display on a device of the user.

20 Claims, 12 Drawing Sheets

SYSTEM AND METHOD FOR GENERATING AND PROVIDING USER-SPECIFIC TRANSACTION INTERFACE

BACKGROUND

Many services, such as instant messaging services, email services, social networks and/or apps may allow a user to create an account capable of sending and receiving messages, such as an email account. The account may be presented via a graphical user interface, which may be used by the user to view, determine a significance of and/or act upon received messages. For example, the user may read, archive, delete, ignore, reply to, and/or forward a received message, and/or may navigate from the message to one or more webpages.

SUMMARY

In accordance with the present disclosure, one or more computing devices and/or methods are provided. In an example, a datastore of a user may be searched for an indication of a potential transaction. The datastore may comprise an email mailbox and/or a record of web browsing. In response to identifying the potential transaction, the datastore of the user, a partnership datastore and/or a network may be searched for an opportunity to modify one or more terms of the potential transaction. In response to identifying the opportunity to modify the one or more terms of the potential transaction, a user-specific transaction interface may be generated. The user-specific transaction interface may comprise one or more selectable inputs for engaging in a modified version of the potential transaction. A notification of the modified version of the potential transaction may be provided for display on a device of the user. In response to the user selecting the notification of the modified version of the potential transaction, the user-specific transaction interface may be provided for display on the device of the user.

In an example, a datastore of a user may be searched for an indication of a potential transaction. The datastore may comprise an email mailbox and/or a record of web browsing. In response to identifying the potential transaction, the datastore of the user, a partnership datastore and/or a network may be searched for an opportunity associated with the potential transaction. In response to identifying the opportunity associated with the potential transaction, a user-specific transaction interface may be generated. The user-specific transaction interface may comprise one or more selectable inputs for engaging in a version of the potential transaction. The user-specific transaction interface may be provided for display on a device of the user.

In an example, a datastore of a user may be searched for an indication of a potential transaction. The datastore may comprise an email mailbox and/or a record of web browsing. In response to identifying the potential transaction, the datastore of the user, a partnership datastore and/or a network may be searched for an opportunity to modify one or more terms of the potential transaction. In response to identifying the opportunity to modify one or more terms of the potential transaction, a user-specific transaction interface may be generated. The user-specific transaction interface may be provided for display on a device of the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
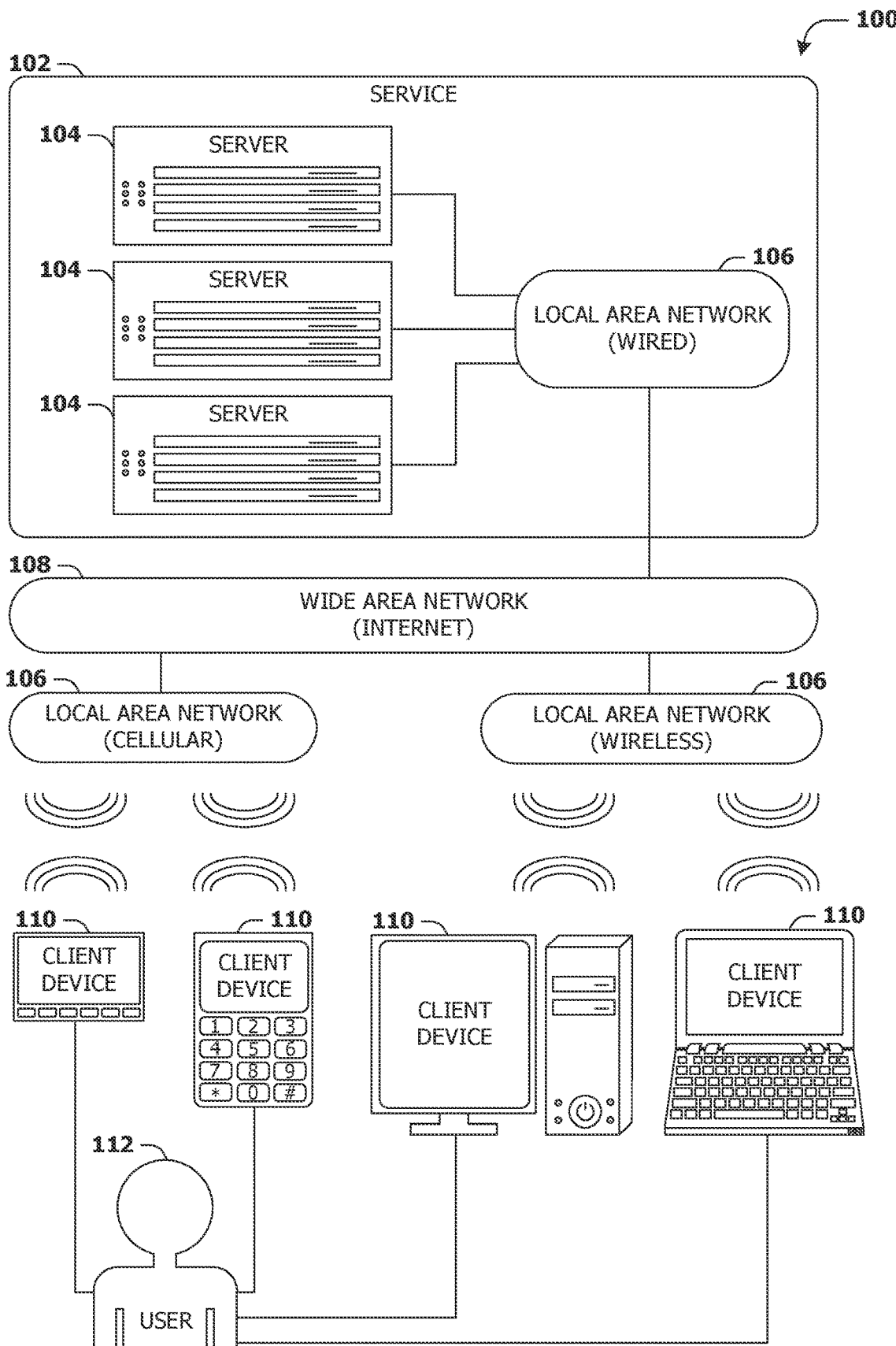
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, datastores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
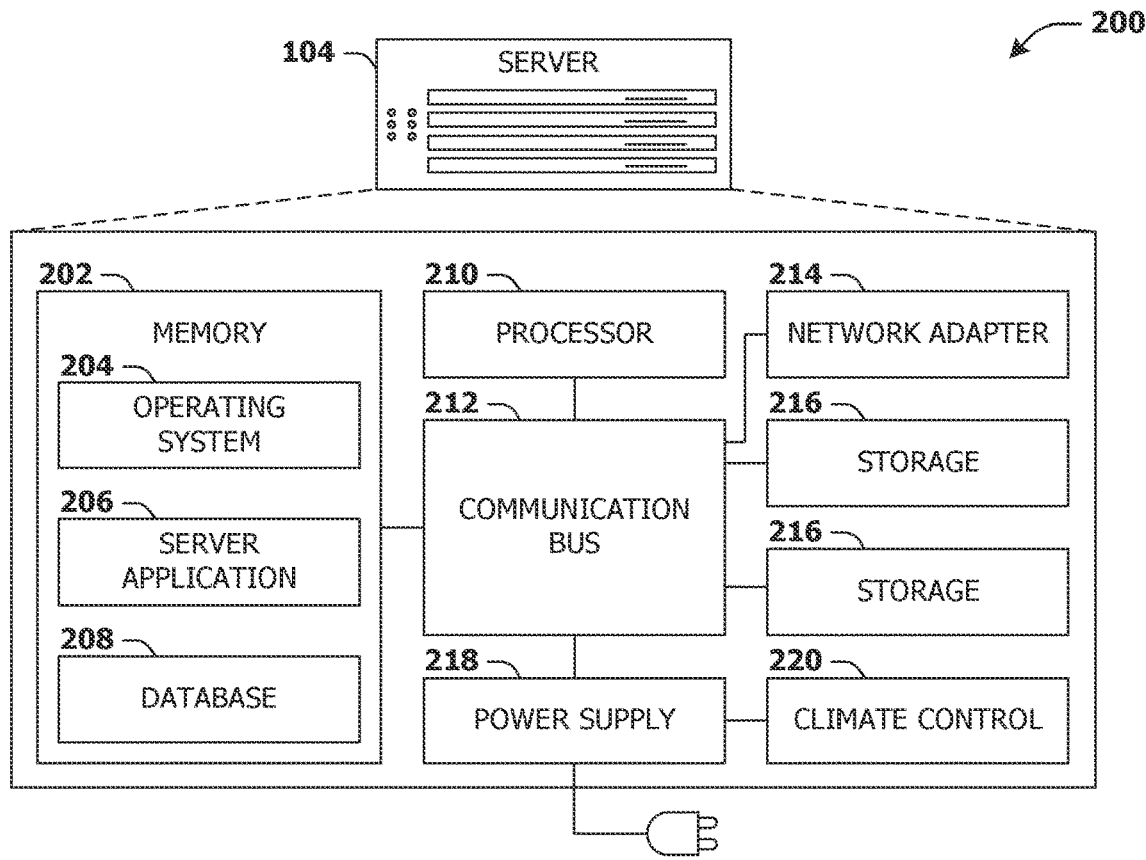
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
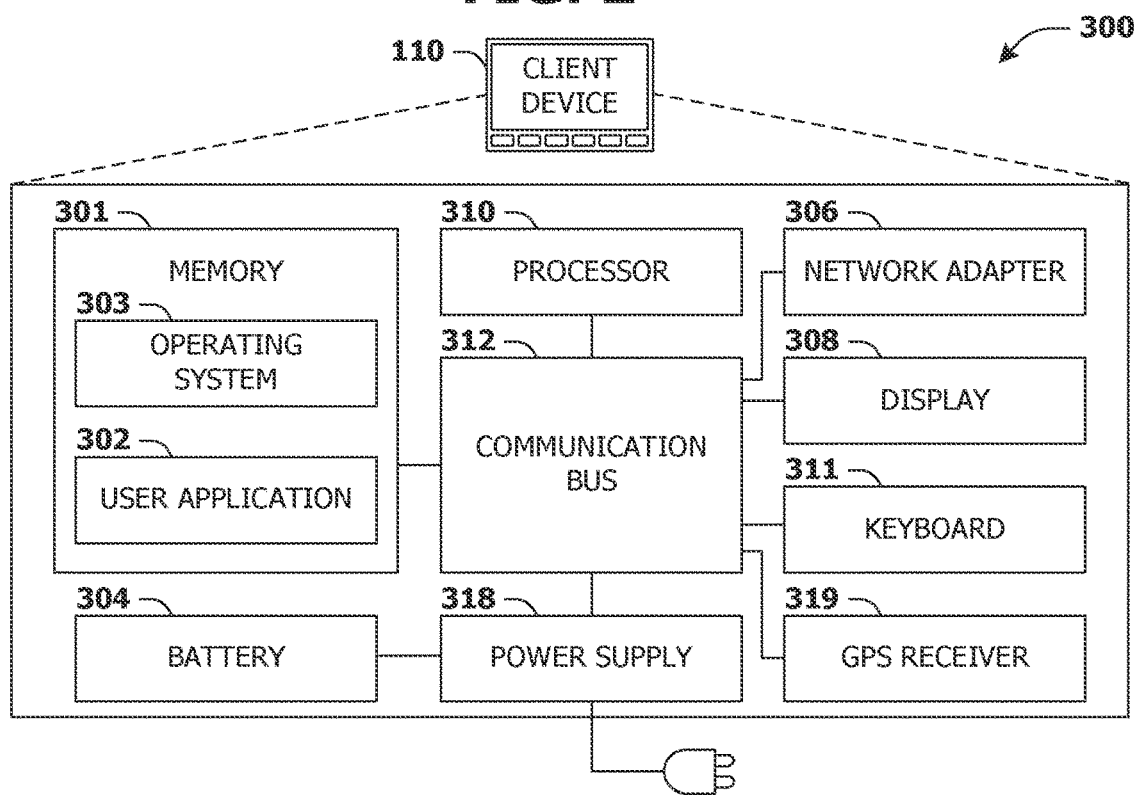
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating and providing a user-specific transaction interface for display via one or more client devices are provided. For example, a user may have a user account (e.g., at least one of a messaging account, an email account, a social network account, an instant messaging account, etc.). The user may perform transactions using the user's device (e.g., a client device, such as a mobile phone, a laptop, a desktop computer, etc.) on at least one of shopping applications (e.g., online shopping applications), service applications (e.g., ride sharing applications, flight booking applications, etc.), etc. However, when the user wants to purchase an item (e.g., purchase a ride service of a ride sharing service, purchase a product from a shopping page, etc.), the client device and/or the user may need to navigate throughout various pages and/or applications (e.g., open and/or view each of the various pages and/or applications) to find the desired item, thereby may consuming a significant amount of time and/or resources of the client device, as well as time and/or effort of the user. Further, in order to find a discount and/or lower cost option for purchasing the item, the client device and/or the user may need to navigate through messages (e.g., emails comprising coupons), web pages, etc. trying to find available coupons for the item and/or determine and/or compare different prices of the item offered by various sellers, thereby consuming additional time and/or resources of the client device (and/or additional time and/or effort of the user).

Thus, in accordance with one or more of the techniques herein, information associated with the user may be analyzed to identify a potential transaction. For example, it may be predicted that the user will perform and/or is interested in performing the potential transaction. The potential transaction may be identified based upon a transaction of the user, such as a completed transaction and/or an incomplete transaction. In an example, the transaction of the user may correspond to a completed transaction with which the user purchased a ride using a ride sharing service from the user's home to a destination, and the potential transaction may correspond to a transaction for a ride from the destination to another location (e.g., back to the user's home). In an example, the transaction may correspond to an incomplete transaction in which the user adds an item to a shopping cart without performing checkout to purchase the item, and the potential transaction may correspond to purchasing the item (e.g., to complete the incomplete transaction).

In response to identifying the potential transaction, the datastore of the user, a partnership datastore and/or a network may be searched for a first opportunity associated with the potential transaction. In some examples, the first opportunity may be associated a coupon in a message (e.g., an email) sent to the user account (e.g., email account) of the user. Alternatively and/or additionally, the first opportunity may be associated with a coupon identified via one or more search results determined from one or more searches performed using one or more queries. Alternatively and/or additionally, the first opportunity may be associated with a partnership contract in the partnership datastore. Alternatively and/or additionally, the first opportunity may be associated with an offer determined by an offer collection module in response to identifying the potential transaction. In some examples, a plurality of opportunities associated with the potential transaction may be determined. The plurality of opportunities may be ranked (based upon cost, for example), and the highest-ranked opportunity may be selected as the first opportunity (e.g., the lowest cost opportunity may be selected from the plurality of opportunities).

In response to identifying the first opportunity associated with the potential transaction, a user-specific transaction interface may be generated. The user-specific transaction interface may comprise one or more selectable inputs for engaging in a version of the potential transaction (e.g., the version of the potential transaction may be determined based upon the first opportunity). A notification of the version of the potential transaction may be provided for display on a device of the user. In response to the user selecting the notification of the version of the potential transaction, the user-specific transaction interface may be provided for display on the device of the user. In some examples, in response to the user selecting a selectable input of the user-specific transaction interface, the versions of the potential transaction may be executed (with the discount and/or terms associated with the first opportunity, for example). In some examples, one or more of the foregoing actions (e.g., identifying the potential transaction, identifying the first opportunity, generating the user-specific transaction interface, providing the notification for display on the device, providing the user-specific transaction interface for display on the device, etc.) may be performed automatically and/or in real time (e.g., immediately) in response to detecting an indication (e.g., at least one of the complete transaction, the incomplete transaction, etc.) of the potential transaction.

Thus, in accordance with one or more of the techniques presented herein, the user may be provided with an interface for purchasing a desired item via the version of the potential transaction with greater speed (e.g., as the device graphically presents the notification and/or the user-specific transaction interface without the user and/or the client device having to navigate through various pages and/or applications to find the desired item and/or find a lower cost option for purchasing the desired item) and improved accuracy (e.g., as the device decreases the probability of the version of the potential transaction and/or a discount associated with the version of the potential transaction being overlooked, etc.). Accordingly, the techniques provided herein improves the speed, accuracy and usability of computer displays.

Figure 4:
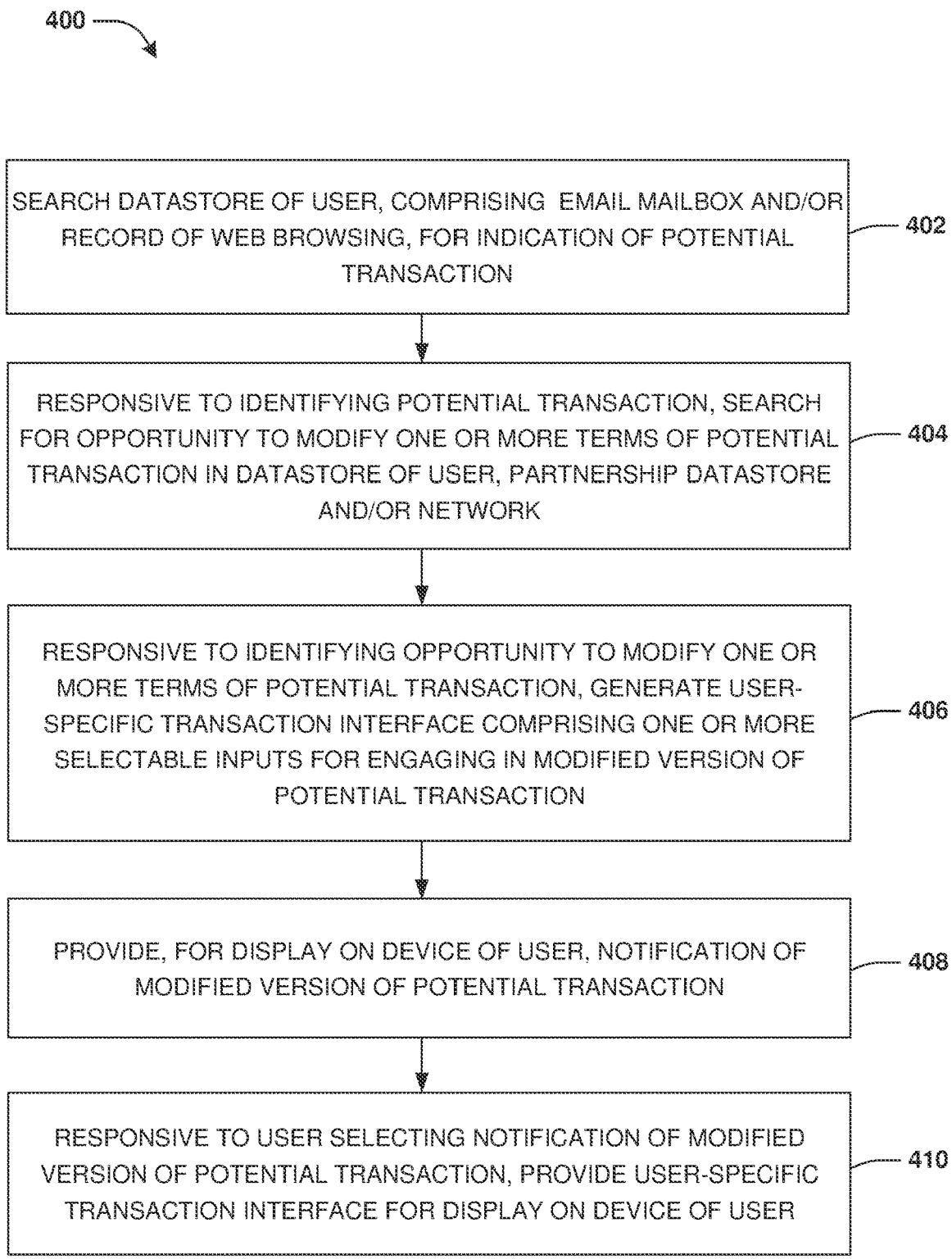
FIG. 4 is a flow chart illustrating an example method for generating and providing a user-specific transaction interface for display via one or more client devices.

An embodiment of generating and providing a user-specific transaction interface for display on a device (e.g., a client device, such as a mobile phone, a laptop, a desktop computer, etc.) of a user is illustrated by an example method 400 of FIG. 4, and is further described in conjunction with system 501 of FIGS. 5A-5G. A user, such as user Jill, (e.g., and/or the device of the user) may access and/or interact with a service for web browsing and/or sending and receiving messages, such as an email service, an instant messaging service, a social network, an application, an internet service, a website, a browser, etc. Information indicative of the web browsing and/or the messages associated with the user may be stored in a datastore of the user. The datastore may comprise (i) a message store (e.g., an email mailbox) comprising one or more datastores for a user account (e.g., at least one of a messaging account, an email account, a social network account, an instant messaging account, etc.) of the user, such as a first datastore for an inbox (e.g., and/or log of incoming communications) of the messaging account, a second datastore for a sent box (e.g., and/or log of outgoing communications) of the messaging account, etc., and/or (ii) a user activity datastore comprising a record of web browsing of the user account (e.g., the record of web browsing may be indicative of web browsing events associated with internet resources, such as web pages, web addresses, etc. being accessed by the user using the Internet) and/or cookies (e.g., Browser cookies). In some examples, the device of the user may have one or more applications installed on it in association with one or more services, where such application(s) may include a messaging application, an email application, a search application, a text messaging application, a social media application, a web browsing application (e.g., a browser), etc. One or more of the applications on the device may be linked to the user account. For example, the email application may be linked to the email account of the user. The user account of the user with the service (e.g., for web browsing and/or sending and receiving messages) may be accessed and/or interacted with (and/or the user may otherwise interact with the device and/or perform one or more actions) via one or more interfaces on the device, such as the aforementioned email application, a browser, an application, or another interface on the device.

At 402, the datastore of the user may be searched for an indication of a potential transaction. In some examples, searching the datastore may comprise analyzing messages (e.g., emails received and/or sent by the user account) and/or web browsing events (e.g., events in which the user accesses and/or interacts with internet resources using the device) for detection of one or more potential transactions. In an example, activity (e.g., new messages received and/or sent by the user account and/or new web browsing events) may be monitored in real-time (e.g., when the activity occurs and/or is logged) for detection of potential transactions. For example, information indicative of activity associated with the user may be analyzed upon (e.g., immediately upon and/or concurrently with) the information indicative of the activity being stored in (e.g., and/or being made available by) the datastore of the user.

Figure 5A:
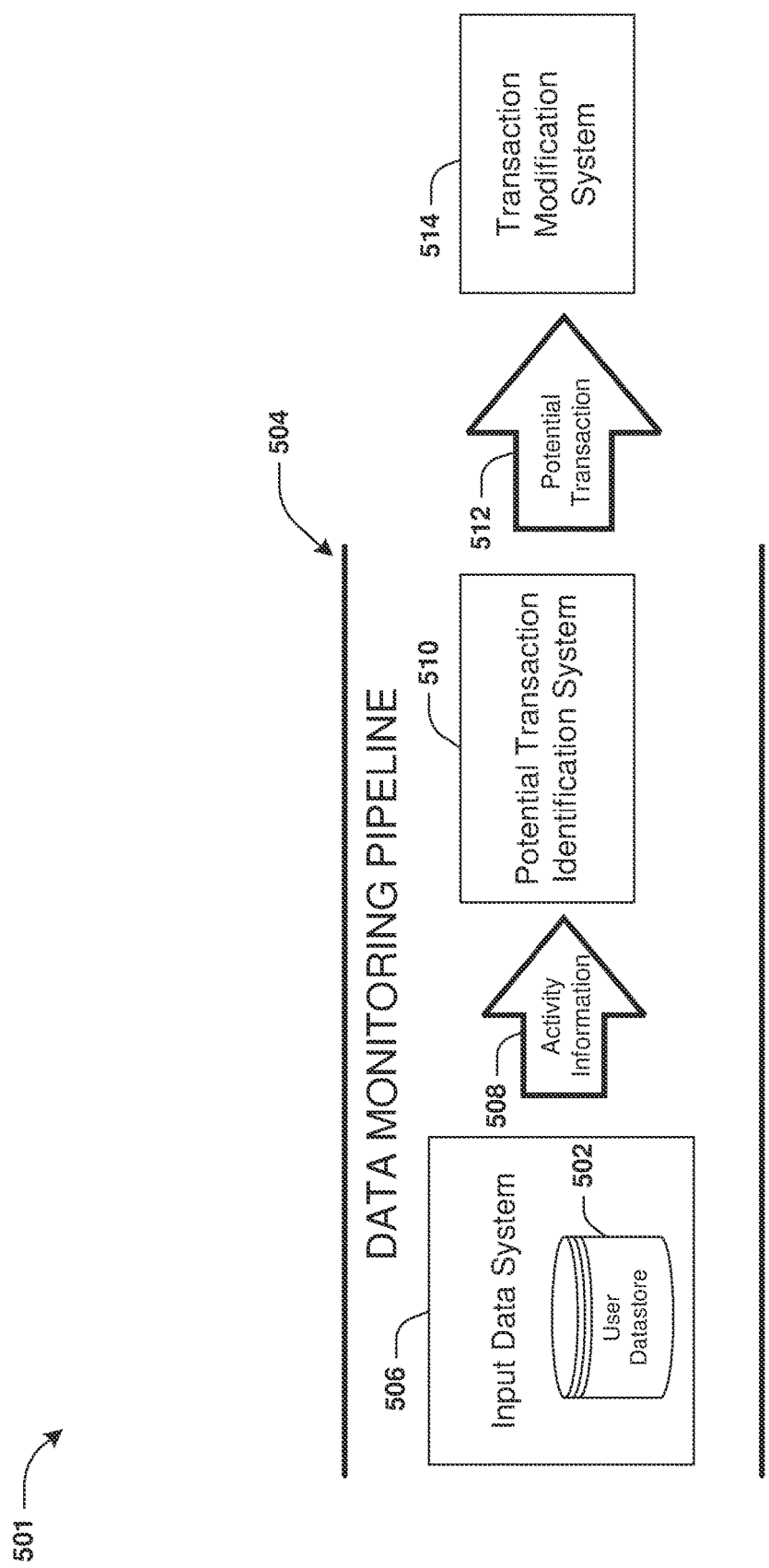
FIG. 5A is a diagram illustrating an example system for generating and providing a user-specific transaction interface for display via one or more client devices.

FIG. 5A illustrates the datastore (shown with reference number 502) of the user being searched for an indication of a potential transaction. A data monitoring pipeline 504 (e.g., a real-time data monitoring pipeline) may be implemented to monitor information (e.g., real-time information) of the datastore 502 of the user. The data monitoring pipeline 504 may comprise an input data system 506 and/or a potential transaction identification system 510. The input data system 506 may analyze the datastore 502 to determine activity information 508 (e.g., real-time activity information) indicative of at least one of messages (e.g., emails) received and/or sent by the user account, web browsing events, etc. For example, the input data system 506 may provide the activity information 508 to the potential transaction identification system 510 in response to (e.g., immediately upon) the activity information 508 being stored in (e.g., and/or being made available by) the datastore 502 of the user. For example, the input data system 506 may provide a message (e.g., an email) to the potential transaction identification system 510 in response to (e.g., immediately upon) the email being received by and/or sent by the user account (e.g., and/or in response to, such as immediately upon, the message being stored in the datastore 502 of the user). Alternatively and/or additionally, the input data system 506 may provide an indication of an event (e.g., a web browsing event in which the user at least one of accesses or interacts with an internet resource) to the potential transaction identification system 510 in response to (e.g., immediately upon) occurrence of the event (e.g., and/or in response to, such as immediately upon, the event being logged in the datastore 502 of the user).

The potential transaction identification system 510 may analyze (e.g., in real-time) the activity information 508 (e.g., the activity information 508 may be analyzed in response to, such as immediately upon, arrival of the activity information 508 from the input data system 506) for detection of one or more potential transactions. In response to identifying a first potential transaction, the potential transaction identification system 510 may provide an indication 512 of the first potential transaction to a transaction modification system 514. In some examples, the data monitoring pipeline 504 comprising the input data system 506 and/or the potential transaction identification system 510 may operate in a real-time continuous manner such that messages and/or events associated with the user are identified and/or analyzed for potential transactions as they are stored in the datastore 502 of the user. Accordingly, potential transactions may be identified with increased speed and/or in real time.

In some examples, the first potential transaction may correspond to a transaction associated with at least one of a message, a web-browsing event, etc. (e.g., indicated by the datastore 102 and/or the activity information 508) associated with the user. For example, the potential transaction identification system 510 may predict, based upon the message and/or the web-browsing event, a likelihood that the user will perform and/or is interested in performing the first potential transaction. The potential transaction identification system 510 may provide the indication 512 of the first potential transaction to the transaction modification system 514 (e.g., and/or a modified version of the first potential transaction may be determined and/or provided to the user) based upon a determination that the likelihood exceeds a threshold likelihood.

In some examples, the first potential transaction may be identified based upon a completed transaction (associated with the user, for example). For example, the completed transaction may be determined based upon a message (e.g., a message in the message store, such as an email in the email mailbox), received by the user account, comprising a receipt of the completed transaction. The message may comprise (i) buyer identification information (e.g., at least one of name, address, etc.) associated with a buyer of the completed transaction (e.g., the user), (ii) seller identification information (e.g., at least one of name, address, etc.) associated with a seller of the completed transaction (e.g., a company), and/or (iii) transaction details indicative of one or more items (e.g., products and/or services) sold in the completed transaction and/or one or more costs of the one or more items. Accordingly, the buyer (e.g., the user), the seller (e.g., the company that sells the one or more items), the one or more items sold in the completed transaction, and/or the one or more costs of the one or more items may be determined based upon the message. Alternatively and/or additionally, the completed transaction may be determined based upon one or more web browsing events associated with the user (e.g., one or more web browsing events in which the user accessed and/or interacted with one or more internet resources to purchase the one or more items). For example, the buyer (e.g., the user), the seller, the one or more items, and/or the one or more costs may be determined based upon the one or more web browsing events. In an example, the one or more web browsing events may be performed using a browser and/or an application linked to the user account of the user, and the completed transaction may be identified in response to (and/or concurrently with) the one or more web browsing events being logged in the record of web browsing in the datastore 102 (e.g., the one or more web browsing events may comprise an item being added to a shopping cart without being purchased).

In some examples, the completed transaction is determined to be associated with a journey (e.g., a transaction journey). The journey may comprise a set of two or more transactions that are related to each other. For example, one transaction of the journey being performed may indicate a higher likelihood that another transaction of the journey will be performed. In some examples, the first potential transaction may be identified as part of the journey. In an example, the completed transaction may correspond to a first transaction of the set of transactions and/or the first potential transaction may correspond to a second transaction of the set of transactions.

In an example, the journey may be a ride sharing journey in which the user (e.g., or an acquaintance of the user) uses a ride sharing application to travel to one or more locations. In some examples, a ride sharing journey may comprise a set of two or more ride sharing transactions for two or more rides comprising a first ride from a first starting point to a first destination and/or a second ride from a second starting point (e.g., the first destination) to a second destination (e.g., the first starting point and the second destination may be the user's home, such as where the user travels from the home to the first destination with the first ride and travels back home with the second ride). In an example, the completed transaction (based upon which the first potential transaction is identified, for example) may correspond to a ride sharing transaction of the user for the first ride from the first starting point to the first destination. The completed transaction may be determined to be associated with the ride sharing journey based upon a determination that the completed transaction corresponds to a ride sharing transaction. Based upon the determination that the completed transaction is associated with the ride sharing journey, it may be predicted that the user may perform another ride sharing transaction, as a part of the ride sharing journey, after the completed transaction (e.g., after taking the first ride from the user's home to the first destination, the user may want to take a second ride from the first destination back to the user's home or to another location). Accordingly, the first potential transaction may be indicative of a ride sharing transaction (of the ride sharing journey, for example).

In an example, the journey may be a travel journey associated with a trip to a destination. In some examples, the travel journey may comprise a set of two or more travel transactions for the trip. In an example, the completed transaction (based upon which the first potential transaction is identified, for example) may correspond to a first travel transaction (e.g., booking a flight, reserving a hotel, etc.). The completed transaction may be determined to be associated with the travel journey based upon a determination that the completed transaction corresponds to a travel transaction. Based upon the determination that the completed transaction is associated with the travel journey, it may be predicted that the user may perform a second travel transaction, as a part of the travel journey, after the completed transaction. In an example, the completed transaction may correspond to a transaction for a hotel at the destination. Accordingly, the first potential transaction may be indicative of a travel transaction (of the travel journey, for example), such as at least one of a transaction for booking a flight to and/or from the destination, a transaction for making restaurant reservations at the destination, etc.

In an example, the journey may be a project associated with purchasing two or more items (e.g., products and/or services). In some examples, the project may correspond to at least one of a desktop computer building project, a home improvement project (e.g., building a deck, a kitchen remodeling project, etc.), etc. In an example, the project may comprise a set of two or more item purchase transactions for two or more items that are utilized to perform and/or complete the project. In an example, the completed transaction (based upon which the first potential transaction is identified, for example) may correspond to an item purchase transaction of the user for a first item. The item purchase transaction may be determined to be associated with the project based upon the first item (which may be determined based upon an indication of the first item in the receipt, for example) and/or a defined list of items associated with the project. For example, the first item may be compared with the defined list of items associated with the project. The completed transaction may be determined to be associated with the project based upon a determination that the first item matches an item among the defined list of items. In an example in which the project corresponds to a desktop computer building project, the first item (purchased via the completed transaction) may correspond a computer case, and the defined list of items associated with the project may comprise at least one of a computer case, a motherboard, memory, system cooling, etc. For example, it may be predicted that the user may purchase other items of the defined list of items (other than the computer case), as a part of the project, after purchase of the first item. Accordingly, the first potential transaction may be indicative of a transaction for purchasing one or more of the other items.

In some examples, the first potential transaction may be identified based upon an incomplete transaction (associated with the user, for example). For example, the incomplete transaction may be determined based upon a message (e.g., a message in the message store, such as an email in the email mailbox), received by the user account, comprising an indication of the incomplete transaction (e.g., an email indicating that the user has an item sitting in a shopping cart that still has not been purchased). The message may comprise (i) buyer identification information (e.g., at least one of name, address, etc.) associated with a buyer of the incomplete transaction (e.g., the user), (ii) seller identification information (e.g., at least one of name, address, etc.) associated with a seller of the incomplete transaction (e.g., a company), and/or (iii) transaction details indicative of one or more items (e.g., products and/or services) to be sold via the incomplete transaction and/or one or more costs of the one or more items. Accordingly, the buyer (e.g., the user), the seller (e.g., the company that sells the one or more items), the one or more items to be sold in the incomplete transaction, and/or the one or more costs of the one or more items may be determined based upon the message. Alternatively and/or additionally, the incomplete transaction may be determined based upon one or more web browsing events associated with the user (e.g., one or more web browsing events in which the user accessed and/or interacted with one or more internet resources to learn about the one or more items and/or add the one or more items to a shopping cart). For example, the buyer (e.g., the user), the seller, the one or more items, and/or the one or more costs may be determined based upon the one or more web browsing events. In an example, the one or more web browsing events may be performed using a browser and/or an application linked to the user account of the user, and the incomplete transaction may be identified in response to (and/or concurrently with) the one or more web browsing events being logged in the record of web browsing in the datastore 102 (e.g., the one or more web browsing events may comprise an item being added to a shopping cart without being purchased). For example, a first record in the record of web browsing may be determined to be indicative of the incomplete transaction. In an example, the first potential transaction may be determined to be the incomplete transaction (e.g., it may be predicted that the user may want to complete the incomplete transaction in the future).

Figure 5B:
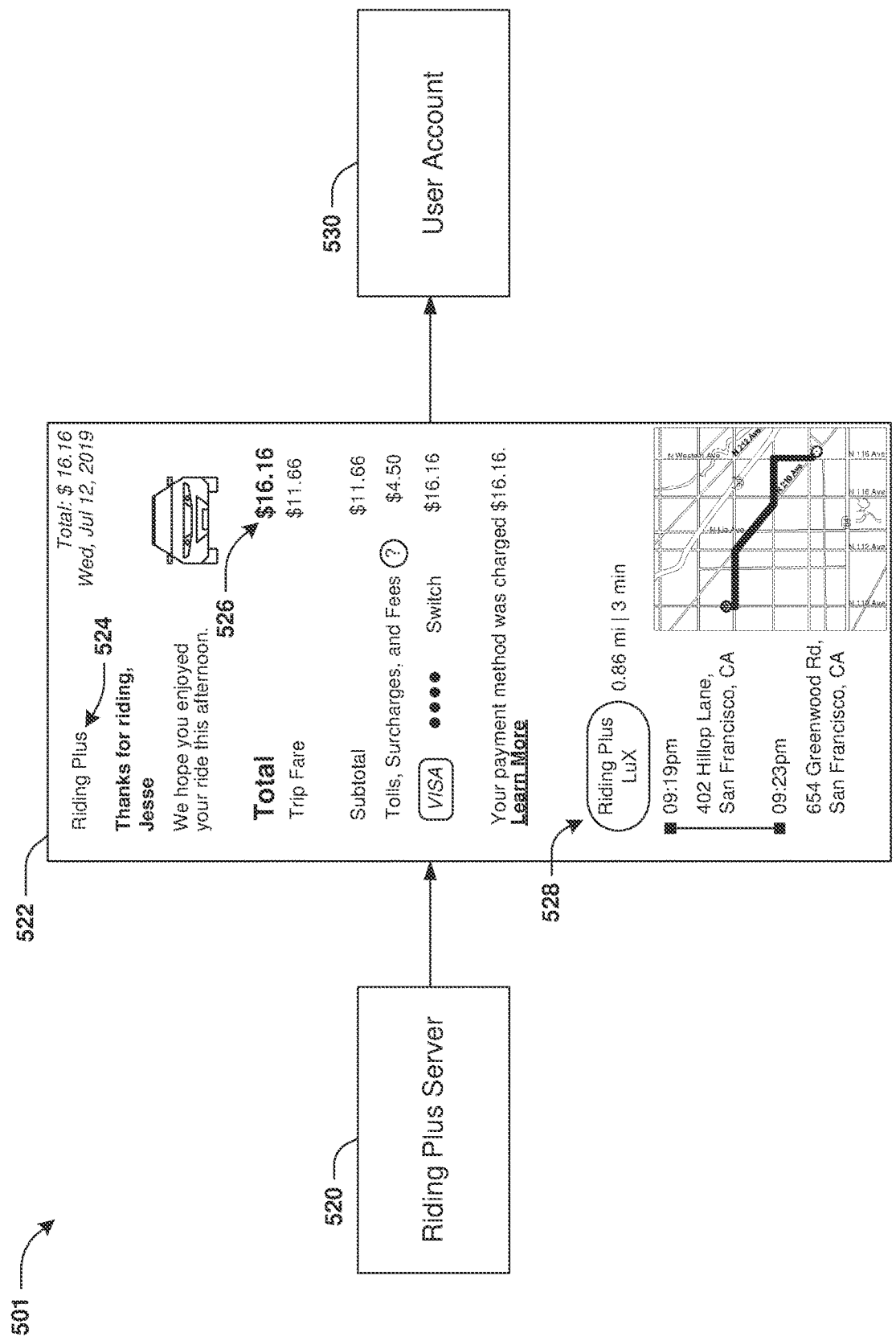
FIG. 5B is a diagram illustrating an example system for generating and providing a user-specific transaction interface for display via one or more client devices.

FIG. 5B illustrates a message 522 (e.g., an email) being transmitted to the user account (shown with reference number 530) of the user by an entity server 520 associated with the completed transaction. In FIG. 5B, the completed transaction corresponds to a ride sharing transaction. The message 522 may comprise a receipt indicative of the ride sharing transaction. For example, the receipt may comprise (i) an indication 524 of the entity (e.g., a company that is named "Riding Plus" and provides ride sharing services), (ii) an indication 526 of the cost of the ride sharing transaction, and/or (iii) an indication 528 of ride details associated with the ride sharing transaction (e.g., at least one of a start time of the ride, an end time of the ride, a starting location of the ride, a destination of the ride, a map indicative of a route of the ride, etc.). In some examples, in response to receiving the message 522 and/or storing the message 522 in the datastore 102 (e.g., in the email mailbox in the datastore 102), the system 501 may perform (e.g., perform in real time and/or using the data monitoring pipeline 504) one or more actions comprising (i) analyzing the message 522 to identify the receipt, (ii) identifying the ride sharing transaction based upon the receipt, and/or (iii) determining the first potential transaction based upon the ride sharing transaction.

At 404, in response to identifying the first potential transaction, the datastore 102, a partnership datastore and/or a network may be searched for a first opportunity to modify one or more terms of the first potential transaction. For example, a plurality of opportunities may be identified (from the datastore 102, the partnership datastore and/or the network, for example), and the first opportunity may be selected from the plurality of opportunities. In some examples, in response to identifying the first opportunity (e.g., in response to selecting the first opportunity from the plurality of opportunities), a modified version of the first potential transaction may be determined based upon the first opportunity and the first potential transaction.

In some examples, an opportunity (e.g., the first opportunity, an opportunity of the plurality of opportunities, etc.)

may be associated with a coupon determined to be associated with the first potential transaction. The coupon may be identified based upon a message (e.g., a message in the message store, such as an email in the email mailbox) comprising the coupon associated with the first potential transaction. For example, messages in the message store (e.g., emails in the email mailbox) may be analyzed based upon one or more characteristics of the first potential transaction (e.g., a type of transaction of the first potential transaction, an item to be purchased in the first potential transaction, etc.) to identify the message comprising the coupon and/or determine that the coupon is applicable to the first potential transaction. Alternatively and/or additionally, the coupon may be determined by searching the network (e.g., at least one of the Internet, one or more public networks, one or more private networks, etc.) using a query (e.g., a query generated based upon the one or more characteristics of the first potential transaction) and analyzing search results (e.g., internet resources such as web pages) of the query. For example, it may be determined that a first search result of the query comprises the coupon associated with the first potential transaction. In an example in which the first potential transaction corresponds to a ride sharing transaction, the query may comprise an indication of an entity that provides ride sharing services (e.g., the entity may be named "Riding Plus" and the query may comprise "Riding Plus Coupons"). In an example in which the first potential transaction corresponds to a purchase of a product, the query may comprise an indication of the product (e.g., the product may be a computer monitor and the query may comprise "Computer Monitor Coupons").

In an example, the coupon may be usable to apply a discount on a future transaction (e.g., the first potential transaction). In an example, a cost of the modified version of the first potential transaction may be determined based upon the coupon and/or an original cost of the first potential transaction. For example, the original cost may be modified to determine the cost of the modified version of the first potential transaction (e.g., the discount indicated by the coupon may be applied to the original cost to determine the cost of the modified version of the first potential transaction).

In some examples, an opportunity (e.g., the first opportunity, an opportunity of the plurality of opportunities, etc.) may be associated with a first partnership contract in the partnership datastore determined to be associated with the first potential transaction. The partnership datastore may comprise a plurality of partnership contracts associated with various types of transactions. The first partnership contract may be determined to be associated with the first potential transaction based upon one or more characteristics of the first potential transaction (e.g., a type of transaction of the first potential transaction, an item to be purchased in the first potential transaction, etc.). The first partnership contract may correspond to an agreement with an entity that provides services associated with the first potential transaction. The first partnership contract may be indicative of at least one of a cost of an item (e.g., a product and/or service) from the entity (e.g., the cost indicated by the first partnership contract may be a lower and/or discounted cost as compared to a cost of the item without using the first partnership contract), a discount that can be applied in a transaction with the entity, etc. In an example, the first potential transaction may correspond to a ride sharing transaction for a ride between two locations, and the first partnership contract may be indicative of a discount (e.g., 10% discount) that can be applied to the ride and/or a cost (e.g., a discounted cost) for the ride.

The first partnership contract may comprise one or more conditions that need to be met in order to apply at least one of the cost of the first partnership contract, the discount of the first partnership contract, etc. (and/or other terms of the first partnership contract) to the first potential transaction. Whether the one or more conditions are met may be determined based upon at least one of the first potential transaction, the completed transaction, the incomplete transaction, web browsing activity of the user, location of the user, etc. For example, a condition of the one or more conditions may be that a brand associated with at least one of the first potential transaction, the completed transaction, the incomplete transaction, etc. is among a defined list of competitor brands indicated by the first partnership contract. Alternatively and/or additionally, a condition of the one or more conditions may be that the location of the user is within a geographical region indicated by the first partnership contract. Accordingly, the first partnership contract may be determined to be associated with (e.g., usable for) the first potential transaction based upon a determination that the one or more conditions are met.

In some examples, the first partnership contract (and/or other partnership contracts in the partnership datastore) may be stored in the partnership datastore before (or after) the first potential transaction is identified. In some examples, information indicative of the first partnership contract may be received from the entity (e.g., received from a device associated with the entity). For example, the information may be received in response to transmitting (to the entity) a request for a partnership contract. After the first partnership contract is stored in the partnership datastore, the first partnership contract may be updated (and/or replaced with a different partnership contract) based upon further information received from the entity.

In some examples, an opportunity (e.g., the first opportunity, an opportunity of the plurality of opportunities, etc.) may be associated with a first offer received from an entity. In some examples, in response to identifying the first potential transaction, an offer collection module (e.g., comprising a real-time application programming interface (API)) may transmit one or more offer requests to one or more entities (e.g., the one or more offer requests may be transmitted over the network, such as the Internet, one or more public networks, one or more private networks, etc.). An offer request may comprise transaction information associated with at least one of the first potential transaction, the completed transaction, the incomplete transaction, etc. An entity may provide an offer to the offer collection module in response to the offer request. The offer may be received over the network. The offer may be indicative of at least one of a cost of an item (e.g., a product and/or service) from the entity (e.g., the cost indicated by the offer may be discounted cost as compared to a cost of the item without using the offer), a discount that can be applied in a transaction with the entity, etc. In an example, the first potential transaction may correspond to a ride sharing transaction for a ride between two locations, and the offer may be indicative of a discount (e.g., 10% discount) that can be applied to the ride and/or a cost (e.g., a discounted cost) for the ride. Transmission of the one or more offer requests and/or reception of the one or more offers may be performed in real-time (e.g., immediately upon identifying the first potential transaction).

Figure 5C:
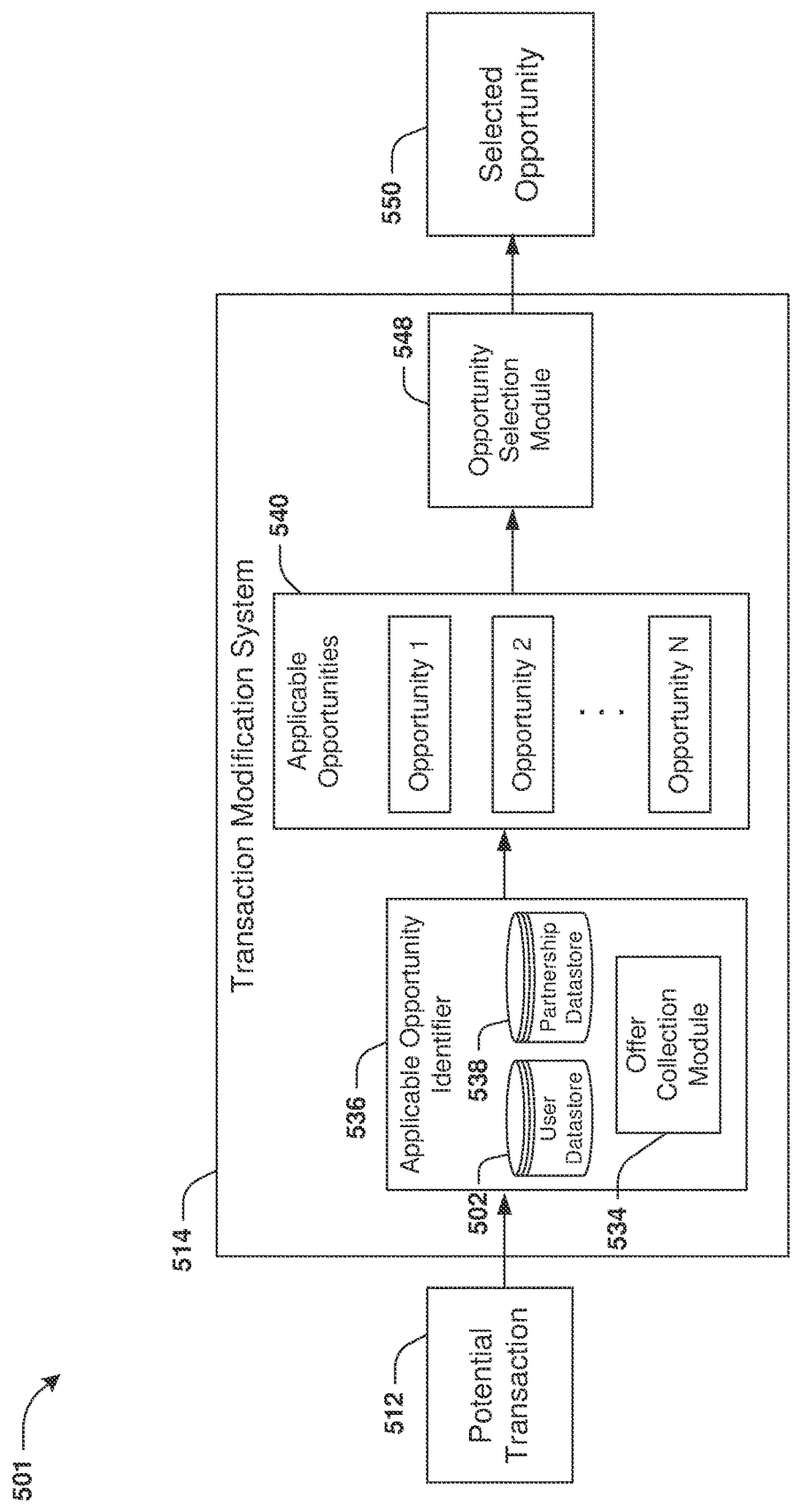
FIG. 5C is a diagram illustrating an example system for generating and providing a user-specific transaction interface for display via one or more client devices.

FIG. 5C illustrates identification of the first opportunity (shown with reference number 550). In some examples, the indication 512 of the first potential transaction is input to an applicable opportunity identifier 536. The applicable opportunity identifier 536 may identify a plurality of opportunities 540 (e.g., a plurality of opportunities applicable to the first potential transaction) based upon the first potential transaction. For example, the applicable opportunity identifier 536 may search the datastore 102, the partnership datastore (shown with reference number 538), and/or the network (not shown) for opportunities applicable to the first potential transaction. Alternatively and/or additionally, the applicable opportunity identifier 536 may comprise the offer collection module (shown with reference number 534) configured to transmit offer requests and/or receive one or more offers associated with the first potential transaction. The plurality of opportunities 540 may comprise N opportunities. The plurality of opportunities 540 may comprise (i) one or more opportunities associated with one or more coupons identified in the datastore 502 (e.g., one or more coupons in one or more emails in the email mailbox), (ii) one or more opportunities associated with one or more coupons identified via search results determined from one or more searches performed using one or more queries, (iii) one or more opportunities associated with one or more partnership contracts in the partnership datastore 538, and/or (iv) one or more opportunities associated with one or more offers determined by the offer collection module 534.

In some examples, the plurality of opportunities 540 may be input to an opportunity selection module 548, which may select the first opportunity 550 from the plurality of opportunities 540. In some examples, the opportunity selection module 548 may rank the plurality of opportunities 540 based upon cost (e.g., the plurality of opportunities 540 may be ranked in ascending order of cost) and/or select the highest-ranked opportunity as the first opportunity 550 (e.g., the lowest cost opportunity may be selected from the plurality of opportunities 540). Alternatively and/or additionally, the plurality of opportunities 540 may be ranked based upon one or more other attributes different than cost.

In some examples, in response to identifying the first opportunity, the modified version of the first potential transaction may be determined based upon the first opportunity and the first potential transaction. For example, one or more terms (e.g., at least one of a cost, a service, etc.) of the first potential transaction may be modified based upon the first opportunity. Alternatively and/or additionally, one or more terms of the modified version of the first potential transaction may be determined based upon the first opportunity.

In some examples, the first opportunity is associated with a discount (e.g., a discount associated with at least one of a coupon, an offer, a partnership contract, etc.). The discount may be applied to a cost of the first potential transaction to determine a cost of the modified version of the first potential transaction. In an example, the first potential transaction may correspond to a ride sharing transaction for a ride for $20.00 and/or the first opportunity may be associated with a 15% discount. Accordingly, the 15% discount may be applied to the cost of $20.00 of the first potential transaction to determine a reduced cost of $17.00 for the modified version of the first potential transaction.

In some examples, the first opportunity is associated with a cost that is different than a cost of the first potential transaction (e.g., and/or the completed transaction and/or the incomplete transaction). The cost of the modified version of the first potential transaction may be determined to be the cost associated with the first opportunity. In an example, the first potential transaction (e.g., and/or the completed transaction and/or the incomplete transaction) may correspond to a ride sharing transaction for a ride for $20.00 and/or the first opportunity may be associated with a $15.00 cost of the ride. Accordingly, the modified version of the first potential transaction may be associated with a cost of $15.00.

In an example, the first potential transaction (e.g., and/or the completed transaction and/or the incomplete transaction) may be associated with a first entity. The first opportunity may be associated with a second entity different than the first entity associated with the first potential transaction. For example, the first potential transaction (e.g., and/or the completed transaction and/or the incomplete transaction) may be associated with purchasing an item (e.g., a product and/or service) from the first entity, whereas the first opportunity may be an opportunity to purchase the item from the second entity (e.g., with a reduced cost as compared to purchasing the item from the first entity). Accordingly, the modified version of the first potential transaction may be determined to correspond to a purchase from the second entity (instead of the first entity associated with the first potential transaction, for example). For example, a seller of the first potential transaction may be modified from the first entity to the second entity.

In an example, the first potential transaction (e.g., and/or the completed transaction and/or the incomplete transaction) may be associated with one or more first shipping terms for shipping a product to the user. The first opportunity may be associated with one or more second shipping terms different than the one or more first shipping terms. For example, the first potential transaction may be associated with delivering the product to an address of the user within 10 days, whereas the first opportunity may be an opportunity to have the product delivered within 5 days. Accordingly, the modified version of the first potential transaction may be determined to correspond to shipping window of 5 days. For example, the shipping window of the first potential transaction may be modified from 10 days to 5 days to determine the modified version.

In an example in which the first opportunity is associated with a coupon, the modified version of the first potential transaction may be determined based upon the coupon. For example, a discount indicated by the coupon may be applied to a cost of the first potential transaction to determine a cost of the modified version of the first potential transaction.

In an example, the first opportunity may be associated with a partnership contract and/or an offer. The partnership contract and/or the offer may comprise a modification term, such as a discount. The modified version of the partnership contract may be determined based upon the modification term and/or the first potential transaction. For example, the modification term may be applied to the first potential transaction to determine the modified version of the first potential transaction. In an example in which the modification term corresponds to a discount, the discount may be applied to a cost of the first potential transaction to determine a cost of the modified version of the first potential transaction.

In an example, the first potential transaction may correspond to a ride sharing transaction for a ride for $20.00 and/or the first opportunity may be associated with a 15% discount. Accordingly, the 15% discount may be applied to the cost of $20.00 of the first potential transaction to determine a reduced cost of $17.00 for the modified version of the first potential transaction.

At 406, in response to identifying the first opportunity (and/or in response to determining the modified version of the first potential transaction), a user-specific transaction interface may be generated. The user-specific transaction interface may comprise one or more selectable inputs for engaging in the modified version of the first potential transaction. For example, the one or more selectable inputs may comprise a selectable input for executing the modified version of the first potential transaction. In an example, the modified version of the first potential transaction may be executed in response to the user selecting the selectable input. For example, executing the modified version of the first potential transaction may comprise performing a purchase (using payment information associated with the user account, for example) according to the modified version of the first potential transaction. In some examples, the one or more selectable inputs may comprise one or more other selectable inputs (e.g., in addition to the selectable input for executing the modified version of the first potential transaction). For example, the one or more other selectable inputs may be used for selecting and/or adjusting one or more settings of the modified version of the first potential transaction (e.g., the one or more settings may comprise a shipping option, payment information, payment type, shipping address, billing address, etc.).

In an example in which the first opportunity is associated with a discount, executing the modified version of the first potential transaction may be performed based upon the discount. For example, the discount may be used to reduce a cost to determine a discounted cost (e.g., a 15% discount may be used to reduce a $20.00 cost to a discounted cost of $17.00) and/or the modified version of the first potential transaction may be performed by automatically performing a purchase with the discounted cost. In an example in which the discount is associated with a coupon, a coupon identifier of the coupon may be used to apply the discount, such as where the coupon identifier may be submitted (along with payment information associated with the user, for example) to a payment system to execute the modified version of the first potential transaction. In an example in which the discount is associated with a partnership contract, a partnership contract identifier of the partnership contract may be used to apply the discount, such as where the partnership contract identifier may be submitted (along with payment information associated with the user, for example) to a payment system to execute the modified version of the first potential transaction. In an example in which the discount is associated with an offer, an offer identifier of the offer may be used to apply the discount, such as where the offer identifier may be submitted (along with payment information associated with the user, for example) to a payment system to execute the modified version of the first potential transaction.

In an example in which the first opportunity is associated with a cost that is different than a cost of the first potential transaction (e.g., and/or the completed transaction and/or the incomplete transaction), executing the modified version of the first potential transaction may comprise making a payment (e.g., using payment information associated with the user) amounting to the cost associated with the first opportunity (e.g., which may be lower than the cost of the first potential transaction, the completed transaction and/or the incomplete transaction, thereby automatically providing cost savings to the user, for example).

In an example in which the first opportunity is associated with the one or more second shipping terms (different than the one or more first shipping terms associated with the first potential transaction, the incomplete transaction and/or the completed transaction), executing the modified version of the first potential transaction may be performed based upon the one or second shipping terms such that an item purchased via the modified version of the first potential transaction is shipped according to the one or more second shipping terms (which may provide for fasting shipping service than the one or more second shipping terms, for example).

In an example in which the first opportunity is associated with the second entity (different than the first entity associated with the first potential transaction, the incomplete transaction and/or the completed transaction), executing the modified version of the first potential transaction may comprise submitting payment information associated with the user to a payment system associated with the second entity (rather than the first entity, for example).

In some examples, the user-specific transaction interface may be indicative of information associated with the modified version of the first potential transaction and/or the first potential transaction. For example, the information may comprise (i) an indication of a cost of the first potential transaction, (ii) an indication of the first entity associated with the first potential transaction, (iii) an indication of a cost of the modified version of the first potential transaction, (iv) an indication of the second entity associated with the modified version of the first potential transaction, and/or (v) an indication of one or more differences between the first potential transaction and the modified version of the first potential transaction (such that the user may be able to quickly identify the one or more differences, such as at least one of a cost difference, an entity difference, etc.).

At 408, a notification of the modified version of the first potential transaction may be provided for display on the device of the user. The notification may be a push (e.g., from a server) and/or local (e.g., on a device) alert that may be presented on the device, and may include at least some of and/or a summary of the modified version of the first potential transaction. The notification may come in one or more forms (e.g., corresponding to one or more different statuses of the device), such as a banner which may be temporary and/or persistent (e.g., on top and/or on bottom of screen), a badge (e.g., on an icon), an audio alert, etc. In some examples, the notification may be generated and/or provided for display prior to the generation of the user-specific transaction interface. In some examples, the user-specific transaction interface may be generated (and/or stored for future retrieval and/or use) prior to the generation and/or display of the notification.

The user may select the notification of the user-specific transaction interface and/or may otherwise make one or more selections to access the user-specific transaction interface. At 410, the user-specific transaction interface may be provided for display on the device. For example, the user-specific transaction interface may be provided for display on the device in response to the selection of the notification of the user-specific transaction interface by the user (and/or in response to the one or more selections to access the user-specific transaction interface).

In some examples, the user-specific transaction interface may comprise at least a portion of a message (e.g., an email) transmitted to the user account (e.g., the email account of the user). For example, the message may correspond to a potential transaction message (e.g., potential transaction email) comprising information associated with the modified version of the first potential transaction and/or the one or more selectable inputs for engaging in the modified version of the first potential transaction. In an example, the notification may correspond to a notification of the message (e.g., a notification that the user received a new email). The user-specific transaction interface may be displayed by opening and/or displaying the message using a first application (e.g., a web application, a mobile application, a website, etc.) on the device. In an example, the first application may comprise at least one of a messaging application, an email application, a search application, a text messaging application, a social media application, a web browsing application (e.g., a browser), etc. Alternatively and/or additionally, the user-specific transaction interface may comprise at least a portion of the first application. Alternatively and/or additionally, the user-specific transaction interface may comprise at least a portion of an entity application (e.g., a web application, a mobile application, a website, etc.) provided by the second entity associated with the modified version of the first potential transaction. In an example in which the second entity corresponds to an entity that provides ride sharing services, the user-specific transaction interface may comprise at least a portion of a ride sharing application and/or a ride sharing website used to order rides from the second entity. In an example, the entity application provided by the second entity may comprise the one or more selectable inputs for engaging in the modified version of the first potential transaction, and/or the entity application (and/or the one or more selectable inputs) may be displayed in response to the user selecting the notification of the user-specific transaction interface.

Figure 5D:
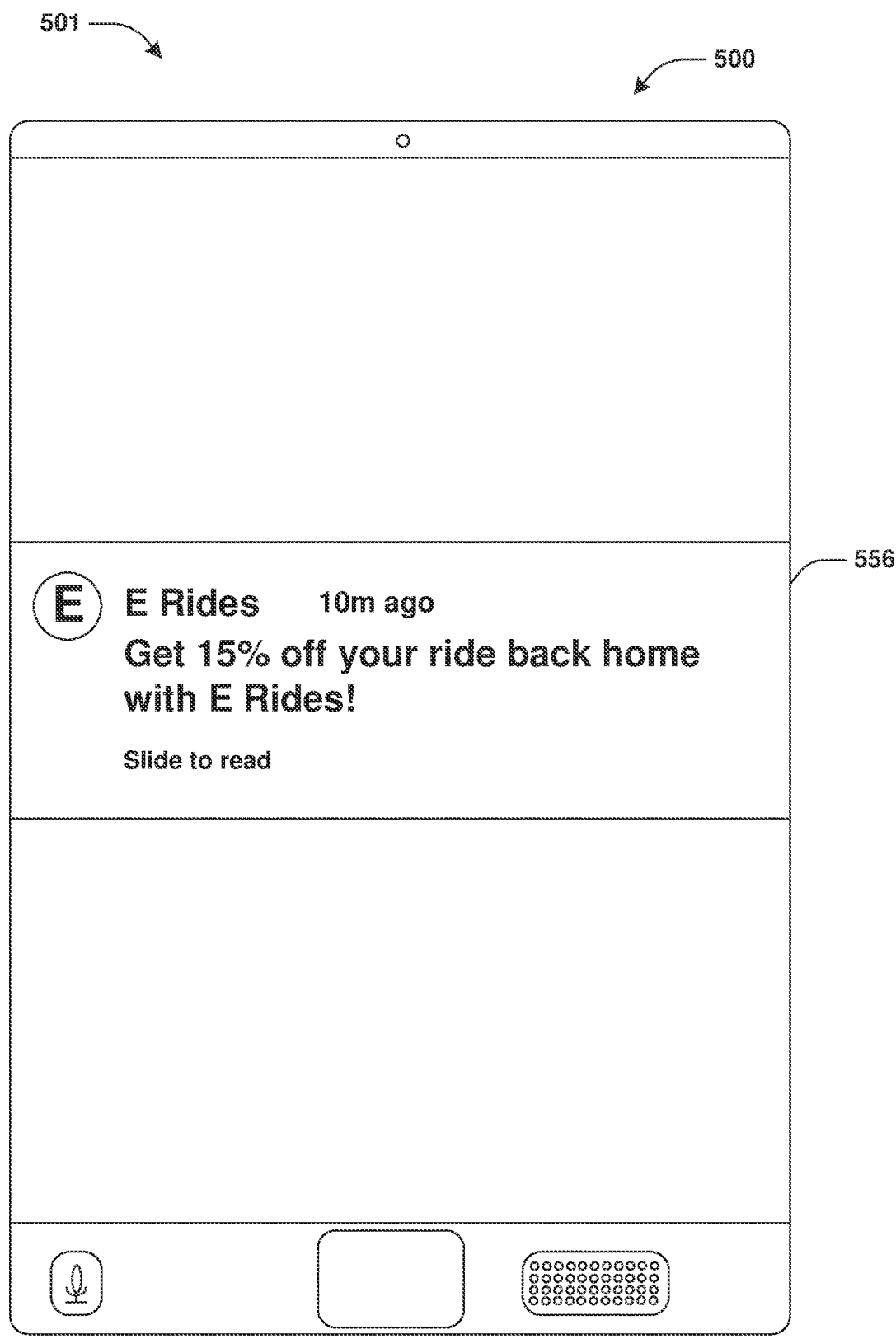
FIG. 5D is a diagram illustrating an example system for generating and providing a user-specific transaction interface for display via one or more client devices.

FIG. 5D illustrates the notification (shown with reference number 556) being displayed via the device (shown with reference number 500) of the user. In an example in which the user-specific transaction interface is associated with the potential transaction message (e.g., potential transaction email), the notification 556 of the user-specific transaction interface may be presented when the potential transaction message (e.g., a new email message) is received for the user account (e.g., email account) of the user. The notification 556 may comprise a representation of a sender of the potential transaction message (e.g., a name, email address, etc.), a subject of the potential transaction message, a representation of a time of receipt of the potential transaction message (e.g., a number of seconds, minutes, hours and/or days ago that the potential transaction message was received, and/or an indication of the date of receipt and/or the time of receipt), and/or a representation of a body of the potential transaction message (e.g., an excerpt of the body of the potential transaction message, a summary of the body of the potential transaction message and/or a translation of one or more portions of the body of the potential transaction message from a foreign language to a language of the user).

Figure 5E:
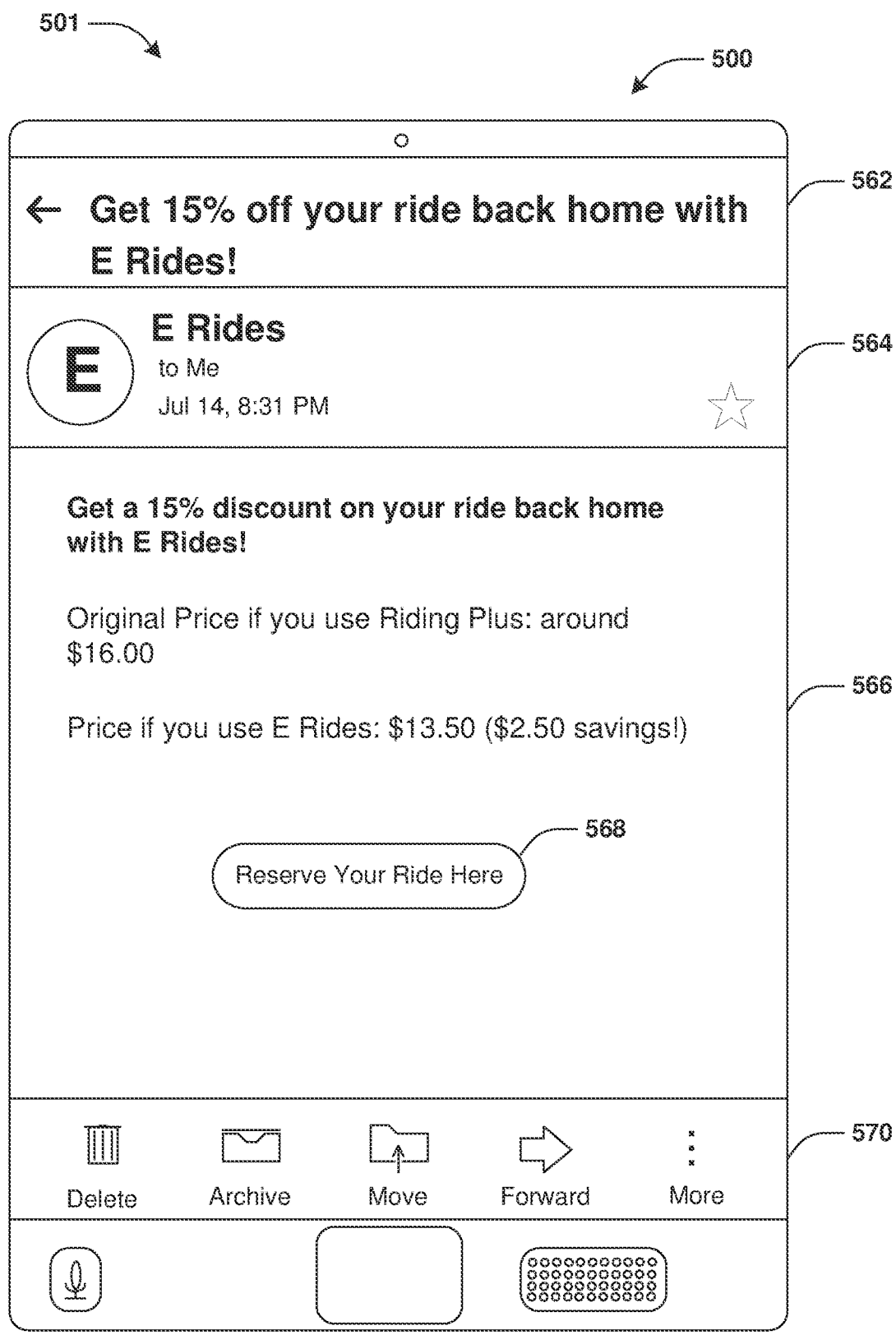
FIG. 5E is a diagram illustrating an example system for generating and providing a user-specific transaction interface for display via one or more client devices.

FIG. 5E illustrates the user-specific transaction interface that may be displayed on the device 500 of the user (e.g., after the user selects the notification 556 displayed in FIG. 5D), such as in an example in which the user-specific transaction interface comprises the potential transaction message. The user-specific transaction interface (e.g., the potential transaction message) may be displayed via the first application. In some examples, the user-specific transaction interface may correspond to the potential transaction message when a default interface is to be presented to the user and/or when the user is determined (e.g., by a user-specific machine learning model trained using interactions of the user) to have a user interest in viewing the potential transaction message without supplemental content. The user-specific transaction interface (e.g., the potential transaction message) may comprise a subject portion 562 indicative of the subject of the potential transaction message, a header portion 564 indicative of the sender of the potential transaction message, one or more recipients of the potential transaction message and/or one or more times and/or dates associated with the potential transaction message, and/or a body portion 566 indicative of content of the body of the potential transaction message. The first application may comprise an action menu 570 displaying one or more user selectable inputs each configured to perform an action in association with the potential transaction message, such as a delete input configured to delete the potential transaction message upon selection, an archive input configured to archive the potential transaction message upon selection, a move input configured to move the potential transaction message to a different folder and/or category upon selection, and/or a forward input configured to present an interface for forwarding the potential transaction message to one or more recipients upon selection. In some examples, the potential transaction message may comprise a selectable input 568 for executing the modified version of the first potential transaction. In an example, the modified version of the first potential transaction may be executed in response to the user selecting the selectable input 568. Alternatively and/or additionally, in response to a selection of the selectable input 568, the device 500 may open the entity application, which may be used to execute the modified version of the first potential transaction.

According to examples shown in FIGS. 5B and 5D-5G, the first entity associated with the first potential transaction (e.g., and/or the completed transaction and/or the incomplete transaction) may be the company "Riding Plus" associated with the completed transaction. The second entity associated with the modified version of the first potential transaction may be a competitor (e.g., a company named "E Rides") of the first entity. The first opportunity may be associated with a discount (e.g., 15% discount). The discount (and/or the modified version of the first potential transaction) may be based upon a coupon (identified in the datastore 502 and/or identified via one or more searches performed using one or more queries, for example) for ride sharing services provided by the second entity. Alternatively and/or additionally, the discount (and/or the modified version of the first potential transaction) may be based upon a partnership contract, in the partnership datastore 538, associated with the second entity. Alternatively and/or additionally, the discount (and/or the modified version of the first potential transaction) may be based upon an offer (from the second entity, for example) determined by the offer collection module 534. In some examples, in response to a selection of the selectable input 568, the modified version of the first potential transaction may be executed (e.g., automatically and/or immediately in response to the selection) to purchase a ride from the second entity (instead of the first entity, for example). Alternatively and/or additionally, in response to a selection of the selectable input 568, the ride sharing application and/or the ride sharing website used to order rides from the second entity may be displayed via the device 500. In some examples, one or more settings (e.g., starting location, destination, etc.) of a ride may be configured via one or more selectable inputs of the ride sharing application and/or the ride sharing website. In response to the selection of a selectable input in the ride sharing application and/or the ride sharing website, the modified version of the first potential transaction may be executed to order the ride.

In some examples, the user-specific transaction interface may be generated using a user-specific machine learning model, which may be trained for the user. The training of the user-specific machine learning model may be based upon one or more interactions of the user with the device 500. Such interactions may include interactions with one or more messages in the user account (e.g., messaging account) of the user, such as opening a message, replying to a message, forwarding a message, sharing a message (e.g., via a social media feed, a blog, etc.), ignoring a message, not opening a message (e.g., even after a portion of the message is displayed), deleting a message, marking a message as spam, associating a message with a label and/or folder, etc. The interactions may alternatively and/or additionally include actions performed (within a threshold period of time, for example) before, after or during the viewing of one or more messages in the user account. For example, the interactions may indicate that upon (and/or within a threshold period of time of) receiving and/or opening a message associated with a first characteristic (e.g., topic, sender, receiver, language, location, etc.), the user opened a browser and/or navigating to content associated with the first characteristic, and/or that upon receiving and/or opening a message associated with a second characteristic (e.g., topic, sender, receiver, language, location, etc.), the user scrolled to the bottom of the message and then opened a browser and searched for "how to unsubscribe from" the sender of the message.

In some examples, the user-specific machine learning model may further be supplemented using interactions of the user (and/or one or more users determined to be similar to the user) with one or more other devices. The user-specific machine learning model used for a user may be a combination of a model generated for the user's user account and one or more global expectation models generated for a plurality of users, a set of users (e.g., employees of a company), a subset (e.g., engineers at the company), etc.

The user-specific machine learning model may be continuously trained over days, months and/or years based upon interactions of the user with the device 500. Accordingly, the user-specific machine learning model can continuously improve the accuracy and/or depth of its understanding of the user's interactions with the device 500, which will in turn improve the accuracy, efficiency and/or effectiveness of the interface of one or more applications with which the user interacts (e.g., one or more applications linked to the user account) using the techniques described herein. The one or more applications may comprise the first application.

The user-specific machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc.

The user-specific transaction interface may be generated based upon the trained user-specific machine learning model and/or the modified version of the first potential transaction. For example, the modified version of the first potential transaction (and/or the potential transaction message) may be scanned and/or analyzed to identify one or more attributes of the modified version of the first potential transaction (and/or the potential transaction message). The one or more attributes may comprise an item (e.g., product and/or service) that may be purchased in the modified version of the first potential transaction, one or more languages of the modified version of the first potential transaction, the second entity associated with the modified version of the first potential transaction, the user, a location of the second entity, and/or one or more locations associated with the modified version of the first potential transaction (e.g., a location of the user and/or the device 500 of the user, a location of the second entity, etc.).

The one or more attributes of the modified version of the first potential transaction may be applied and/or otherwise input to the user-specific machine learning model, and the user-specific machine learning model may output one or more user interests associated with the modified version of the first potential transaction (and/or the potential transaction message). For example, the user-specific machine learning model may use the one or more attributes to predict that the user will have a particular user interest (e.g., to perform one or more actions) upon and/or in response to viewing the modified version of the first potential transaction (and/or the potential transaction message). Supplemental content may be generated based upon the predicted user interest. The supplemental content may be generated using content within the potential transaction message, using one or more profiles associated with the user, and/or by accessing content external to the potential transaction message and/or profiles of the user. For example, the supplemental content may be retrieved from one or more webpages, one or more messages, and/or one or more alternative tabs of one or more applications with which the user interacts (e.g., one or more applications linked to the user account). The one or more applications may comprise the first application.

In some examples, the user-specific transaction interface may be created by combining the supplemental content with the potential transaction message (e.g., one or more portions of the potential transaction message and/or all of the potential transaction message). Alternatively and/or additionally, the user-specific transaction interface may be created using the supplemental content, but may not, for example, comprise one or more portions of the potential transaction message. In some examples, the first application may be configured to have a plurality of selectable tabs, such as a transactions tab, a messaging tab, a contacts tab, a shopping tab, a travel tab, a subscriptions tab, a receipts tab, and/or a people tab. An alternative tab may be identified, from among the plurality of tabs, based upon the predicted user interest associated with the modified version of the first potential transaction (and/or the potential transaction message), and the user-specific transaction interface may be created using the alternative tab, for example.

In some examples, the user-specific transaction interface (e.g., which was generated for the user using the trained user-specific machine learning model) may be provided for display on the device 500 (in response to the selection of the notification 556). For example, the combination of the supplemental content with the potential transaction message may be provided in the user-specific transaction interface, and/or the supplemental content may be provided in the user-specific transaction interface without content of the potential transaction message, and/or the alternative tab identified in association with the potential transaction message may be provided in (and/or as) the user-specific transaction interface.

The first application may comprise one or more tabs, such as an inbox tab (e.g., associated with displaying one or more messages received by the user account and/or stored in an inbox of the user account), a video tab (e.g., associated with displaying one or more messages of the user that have video content), an attachments tab (e.g., associated with displaying one or more messages of the user that have attachments), a transactions tab (e.g., associated with displaying one or more messages of the user that have selectable inputs for engaging in potential transactions), a shopping tab (e.g., associated with displaying one or more messages of the user that have shopping-related content) and/or a travel tab (e.g., associated with displaying one or more messages of the user that have travel-related content), for example.

Figure 5F:
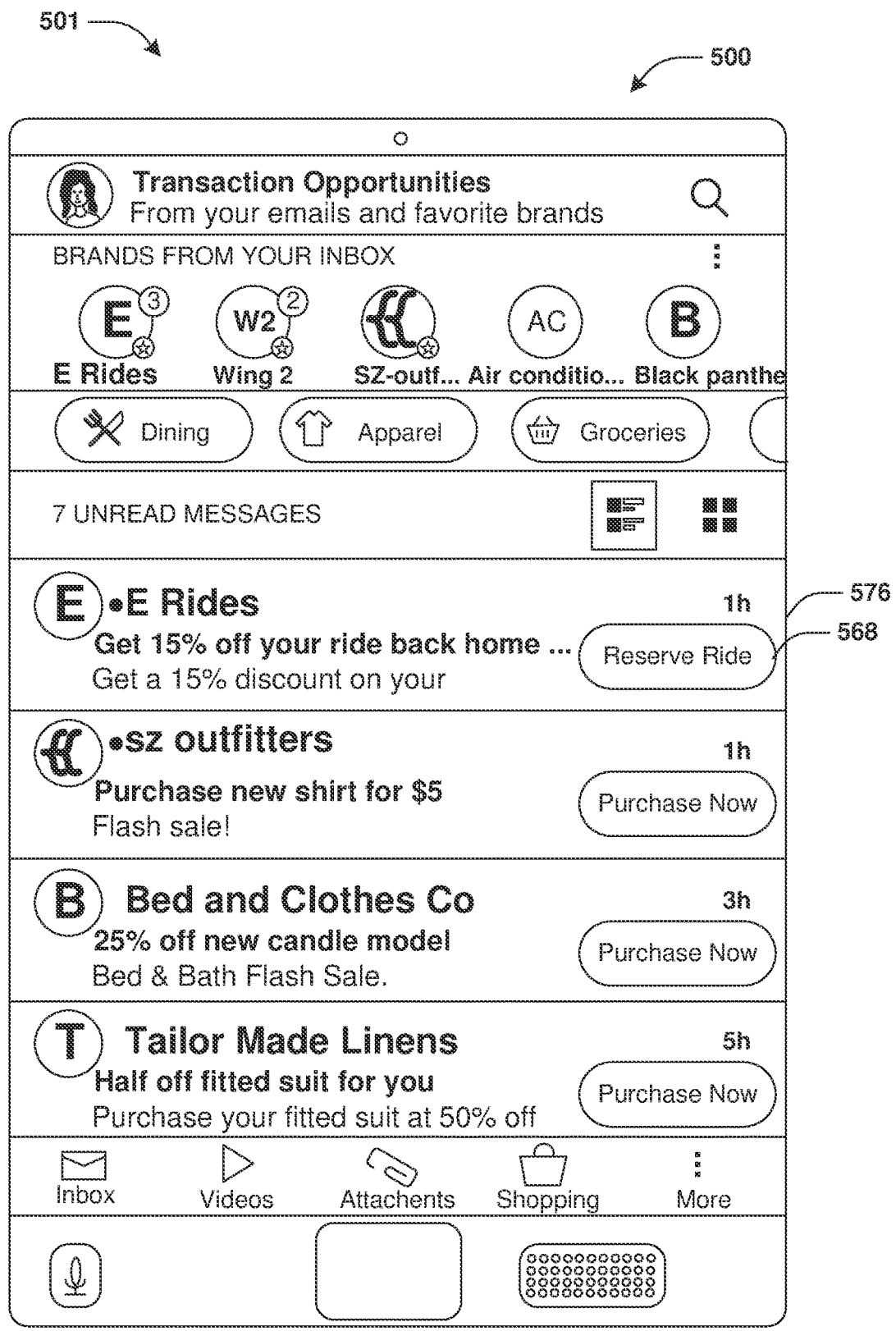
FIG. 5F is a diagram illustrating an example system for generating and providing a user-specific transaction interface for display via one or more client devices.

FIG. 5F illustrates an example of the user-specific transaction interface (e.g., which was generated for the user using the trained user-specific machine learning model) that may be displayed on the device 500 of the user (e.g., after the user selects the notification 556 of FIG. 5D), such as when the user is determined (e.g., by the user-specific machine learning model trained using interactions of the user) to have a user interest in viewing a condensed representation of the potential transaction message in the context of the transactions tab and/or other transaction-related messages, and a user-specific interface representative of that determined user interest is generated and/or presented to the user. The user-specific transaction interface may comprise a portion of the first application installed on the device 500 and/or connected to the user account of the user. For example, the user-specific transaction interface may comprise the transaction tab that displays one or more messages (e.g., emails) of the user that have transaction-related content. The transaction-related messages of the user may include the potential transaction message associated with the notification 556 of FIG. 5D. The user-specific transaction interface may comprise a condensed representation 576 of the potential transaction message, as well as condensed representations of one or more other transaction-related messages of the user. In some examples, the user-specific transaction interface may display (in combination with the condensed representation 576 of the potential transaction message, for example) message-based supplemental content determined to be related to the potential transaction message, such as one or more messages from a same sender as the potential transaction message, one or more messages related to a category of product and/or service associated with the potential transaction message, and/or a listing of one or more purchases previously made (by the user, for example) and determined to be related (e.g., based upon sender, product, category, manufacturer, etc.) to the potential transaction message. In some examples, the condensed representation 576 of the potential transaction message may comprise the selectable input 568 (e.g., a condensed version of the selectable input 568) such that the user may select the selectable input 568 (to execute the modified version of the first potential transaction, for example) directly from the user-specific transaction interface shown in FIG. 5G (without opening the entire potential transaction message, for example), thereby providing for improved use of the display of the device 500.

Figure 5G:
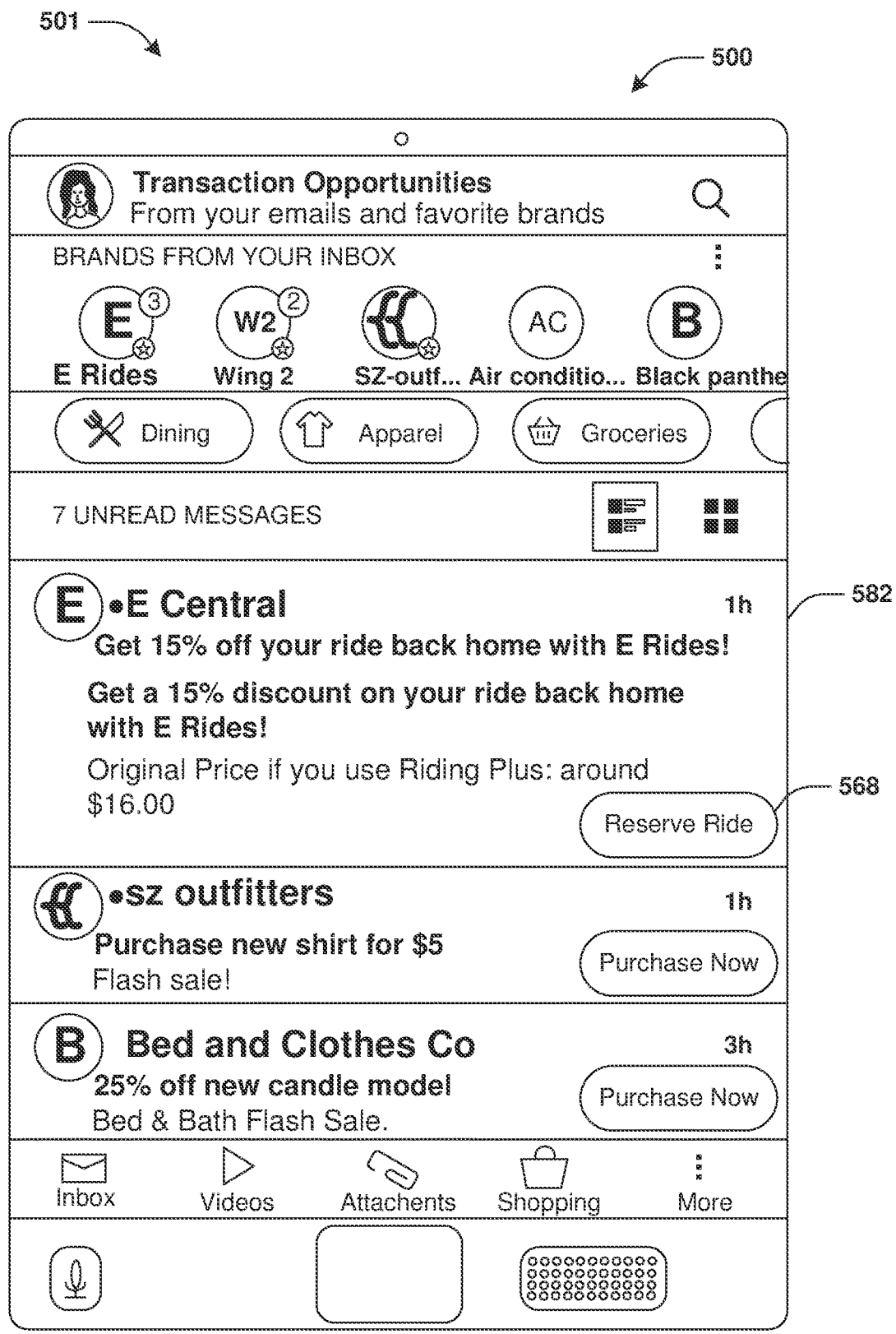
FIG. 5G is a diagram illustrating an example system for generating and providing a user-specific transaction interface for display via one or more client devices.

FIG. 5G illustrates an example of the user-specific transaction interface (e.g., which was generated for the user using the trained user-specific machine learning model) that may be displayed on the device 500 of the user (e.g., after the user selects the notification 556 of FIG. 5D), such as when the user is determined (e.g., by the user-specific machine learning model trained using interactions of the user) to have a user interest in viewing an expanded representation of the potential transaction message in the context of the transaction tab and/or other transaction-related messages, and a user-specific interface representative of that determined user interest is generated and/or presented to the user. The user-specific transaction interface may comprise the transaction tab that displays one or more messages of the user that have transaction-related content, including the potential transaction message represented by the notification 556 of FIG. 5D. The user-specific transaction interface may comprise an expanded representation 582 of the potential transaction message, which may include one or more portions of the potential transaction message (e.g., further text and/or images from a body of the potential transaction message) that were not included in the condensed representation 576 of the potential transaction message illustrated in FIG. 5F. The user-specific transaction interface may further comprise condensed representations of one or more other transaction-related messages of the user. In some examples, the expanded representation 582 of the potential transaction message may comprise the selectable input 568 such that the user may select the selectable input 568 (to execute the modified version of the first potential transaction, for example) directly from the user-specific transaction interface shown in FIG. 5G (without opening the entire potential transaction message, for example).

It may be appreciated that training a user-specific machine learning model based upon interactions, generating a user-specific transaction interface based upon the user-specific machine learning model, providing the user-specific interface for display and/or receiving one or more additional interactions (e.g., with and/or in association with the user-specific interface) as feedback that may be used to further train the user-specific machine learning model may create a closed-loop process allowing usage of feedback to tailor and/or continuously update the user-specific machine learning model used to generate user-specific interfaces, thereby improving (e.g., continuously improving over time) a quality and/or accuracy of generation and/or presentation of user-specific interfaces for one or more applications of a device 500. Closed-loop control may reduce errors and produce more efficient operation of a computer system which implements the user-specific machine learning model and/or generates and/or presents user-specific interfaces. The reduction of errors and/or the efficient operation of the computer system may improve operational stability and/or predictability of operation. Accordingly, using processing circuitry to implement closed loop control described herein may improve operation of underlying hardware of the computer system.

In some examples, multiple opportunities may be selected from the plurality of opportunities 540. A plurality of versions of the first potential transaction may be determined based upon the multiple opportunities (e.g., using the techniques provided herein with respect to determining the modified version of the first potential transaction based upon the first opportunity). In some examples, the user-specific transaction interface may be generated to comprise, in combination and/or concurrently, one or more selectable inputs for engaging in a first version of the plurality of versions of the first potential transaction, one or more selectable inputs for engaging in a second version of the plurality of versions of the first potential transaction, etc. In an example, the transactions tab of the user-specific transaction interface (and/or other transaction-related messages displayed via the user-specific transaction interface) may correspond to versions of the plurality of versions of the first potential transaction. For example, representations of the potential transaction messages corresponding to multiple versions of the plurality of versions of the first potential transaction may be displayed in combination and/or concurrently via the user-specific transaction interface (e.g., in the transactions tab). In an example, the representations corresponding to the multiple versions may be displayed in combination and/or concurrently in response to a selection of the notification 556 of FIG. 5D.

In some examples, one or more of the actions described with respect to the example method 400 of FIG. 4 and/or the example system 501 of FIGS. 5A-5G (e.g., identifying the first potential transaction, identifying the first opportunity, generating the user-specific transaction interface, providing the notification 556 for display on the device 500, providing the user-specific transaction interface for display on the device, etc.) may be performed automatically and/or in real time (e.g., immediately) in response to an indication of the first potential transaction being stored in the datastore 102 (e.g., in response to a receipt indicating a completed transaction associated with the first potential transaction being transmitted to the user account, in response to the user adding an item to a shopping cart without purchasing it, etc.). Thus, the user may be provided with the user-specific transaction interface for purchasing a desired item via the modified version of the first potential transaction with greater speed (e.g., as the device graphically presents the notification 556 and/or the user-specific transaction interface without the user and/or the device 500 having to navigate through various pages and/or applications to find the desired item and/or find a lower cost option for purchasing the desired item) and improved accuracy (e.g., as the device 500 decreases the probability of the modified version of the first potential transaction and/or a discount associated with the modified version of the first potential transaction being overlooked, etc.). Accordingly, the techniques provided herein improves the speed, accuracy and usability of computer displays.

Figure 6:
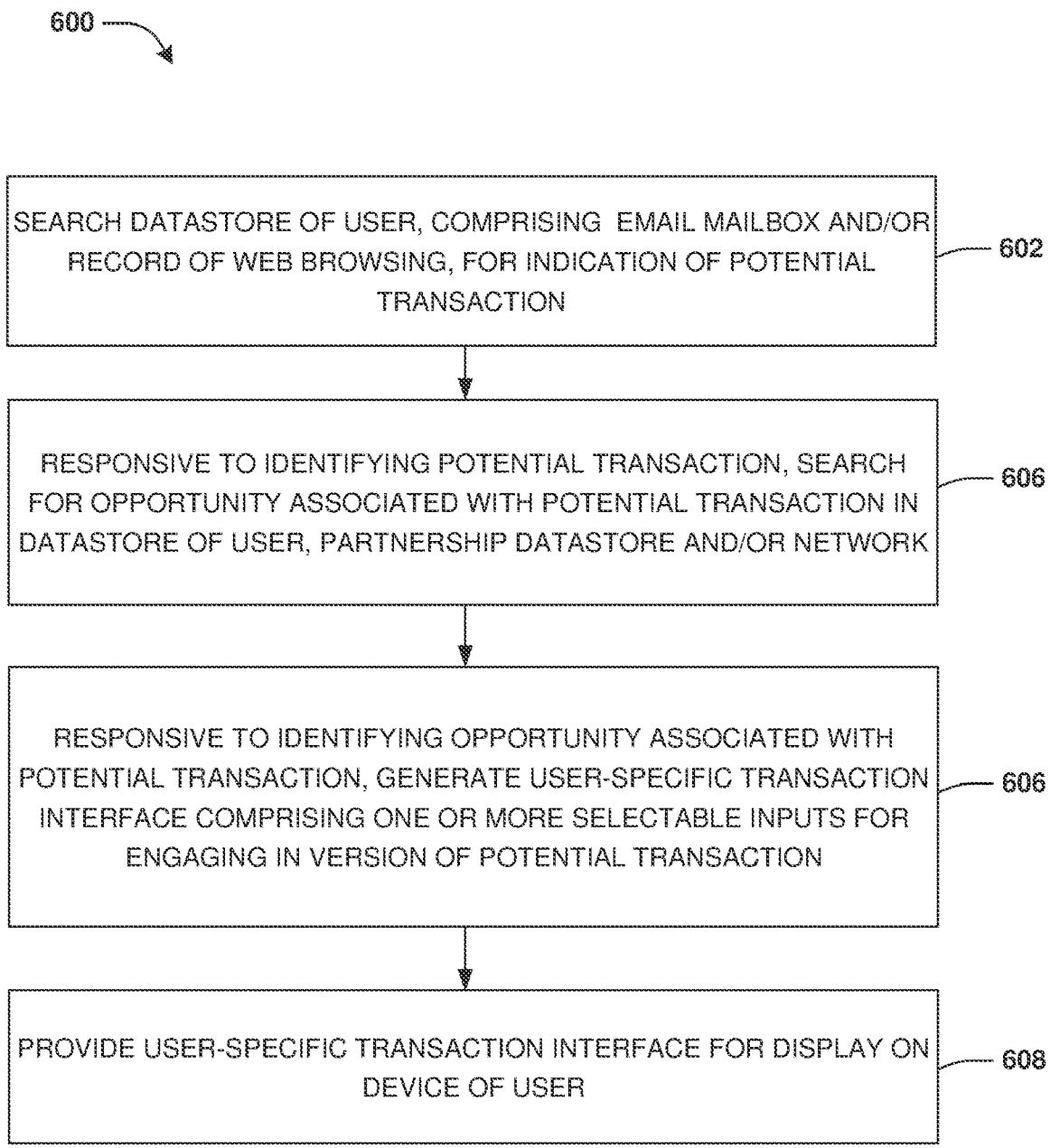
FIG. 6 is a flow chart illustrating an example method for generating and providing a user-specific transaction interface for display via one or more client devices.

An embodiment of generating and providing a user-specific transaction interface for display on a device (e.g., a client device, such as a mobile phone, a laptop, a desktop computer, etc.) of a user is illustrated by an example method 600 of FIG. 6. In some examples, the example method 600 may be implemented using and/or supplemented with one, some and/or all techniques provided herein, including techniques provided with respect to the example method 400 of FIG. 4 and/or the system 501 of FIGS. 5A-5G.

At 602, a datastore of a user is searched for an indication of a first potential transaction. The datastore of the user may comprise an email mailbox and/or a record of web browsing. At 604, in response to identifying the first potential transaction, the datastore of the user, a partnership datastore and/or a network may be searched for a first opportunity associated with the first potential transaction. At 606, in response to identifying the first opportunity associated with the first potential transaction, a user-specific transaction interface may be generated. The user-specific transaction interface may comprise one or more selectable inputs for engaging in a first version of the first potential transaction. The first version of the first potential transaction may be determined based upon the first opportunity. A 608, the user-specific transaction interface may be provided for display on the device of the user.

In some examples, the first potential transaction may correspond to a transaction associated with at least one of a message, a web-browsing event, etc. (e.g., indicated by the datastore) associated with the user. For example, a potential transaction identification system may predict, based upon the message and/or the web-browsing event, a likelihood that the user will perform and/or is interested in performing the first potential transaction. The first opportunity and/or the first version of the first potential transaction may be determined (and/or provided to the user) based upon a determination that the likelihood exceeds a threshold likelihood.

In some examples, the first potential transaction may be determined based upon a transaction (e.g., a completed transaction and/or an incomplete transaction) associated with the user (e.g., the transaction may be identified based upon an indication of the transaction in the datastore). In an example, the first potential transaction may be determined based upon a journey associated with the transaction.

In some examples, the first opportunity may correspond to an opportunity to perform the first potential transaction. The first opportunity (and/or the first version of the first potential transaction) may be determined based upon at least one of a coupon identified in the datastore (e.g., one or more coupons in one or more emails in the email mailbox), a coupon identified via search results determined from one or more searches performed using one or more queries, a partnership in the partnership datastore, and/or an offer determined by an offer collection module. In an example, the first opportunity (and/or the first version of the first potential transaction) may be associated with a discount and/or one or more terms (e.g., quicker shipping speed and/or a higher level of service).

In an example in which the first potential transaction is associated with (e.g., determined based upon) a previous transaction (e.g., a completed transaction and/or an incomplete transaction) associated with the user, the first potential transaction may correspond to an alternative transaction of the previous transaction. For example, the previous transaction may correspond to a purchase of a first item, and/or the first potential transaction may correspond to a purchase of an item that is the same as (or is of the same type as) the first item. The first opportunity (and/or the first version of the first potential transaction) may correspond to an opportunity to purchase the item at a lower cost and/or with different (e.g., improved) terms (e.g., quicker shipping speed and/or a higher level of service) than the previous transaction.

In an example, the previous transaction (e.g., the complete transaction and/or the incomplete transaction associated with the user) may correspond to a flight purchase, and the first potential transaction may correspond to an alternative flight purchase that can be performed for the user as an alternative to the flight purchase. In an example, the first opportunity (and/or the first version of the first potential transaction) may correspond to an opportunity to purchase a flight at a lower cost and/or with different (e.g., improved) terms (e.g., a higher level of service, such as higher baggage allowance) than the previous transaction. In some examples, the flight of the first opportunity may be different than the flight of the previous transaction. In some examples, a boarding location and/or a destination of the flight of the first opportunity may be the same as a boarding location and/or a destination of the previous transaction. In some examples, an airline of the flight of the first opportunity may be different than an airline of the flight of the previous transaction.

Alternatively and/or additionally, the flight of the first opportunity (and/or the first version of the first potential transaction) may be the same as the flight of the previous transaction. In some examples, the first opportunity (and/or the first version of the first potential transaction) may be associated with a purchase, at a lower cost and/or with different (e.g., improved) terms, of the same flight as the flight of the previous transaction. In an example, the first opportunity (and/or the first version of the first potential transaction) may be associated with purchasing the flight from a first entity (e.g., a first flight booking service) different than a second entity (e.g., a second flight booking service) of the flight purchase of the previous transaction, whereby the first entity offers the flight at a lower cost and/or with different (e.g., improved) terms as compared to the previous transaction with the second entity. In an example, the first opportunity (and/or the first version of the first potential transaction) may be associated with purchasing the flight using a discount (e.g., a discount provided by at least one of a coupon, an offer determined by the offer collection module, a partnership contract in the partnership datastore, etc.).

In some examples, the user-specific transaction interface may comprise information associated with the first opportunity. The one or more selectable inputs for engaging in the first version of the first potential transaction may comprise a selectable input for executing the first version of the first potential transaction. In some examples, in response to the user selecting the selectable input, the first version of the first potential transaction may be executed. For example, executing the first version of the first potential transaction may comprise performing a purchase (using payment information associated with the user, for example) according to the first version of the first potential transaction. In an example in which the first version of the first potential transaction is an alternative to the previous transaction, the previous transaction may be cancelled (e.g., automatically cancelled) in response to reception of the selection of the selectable input (e.g., the previous transaction may be cancelled in addition to executing the first version of the first potential transaction). In some examples, the previous transaction is cancellable within a defined time window (e.g., until one hour after purchase, one day after purchase, etc.). The user-specific transaction interface may comprise an indication of the defined time window (such that the user knows how much time they have to execute the first version of the first potential transaction and/or cancel the previous transaction). In some examples, the selectable input (and/or an execution function and/or cancel function executed in response to the selection of the selectable input) may be active during the defined time window and/or may be deactivated when the defined time window ends. In this way, in response to the user selecting the selectable input (within the defined time window, for example), (i) the first version of the first potential transaction may be automatically executed (to provide the user with the benefit of a lower cost and/or improved terms as compared to the previous transaction), and/or (ii) the previous transaction may be cancelled and/or a refund request may be submitted for the previous transaction (e.g., so that a previous payment of the user in the previous transaction is refunded to an account of the user), thereby providing for improved usability of the display of the device (e.g., as a result of the device and/or the user not needing to manually navigate through web pages associated with the previous transaction to find a page for cancelling the previous transaction and/or manually submit a refund request associated with the previous transaction).

It may be appreciated that implementation of at least some of the disclosed subject matter may lead to benefits including, but not limited to, a reduction in screen space and/or an improved usability of a display (e.g., of the device 500) (e.g., as a result of identifying the potential transaction, identifying the first opportunity associated with the potential transaction, and/or providing a user-specific transaction interface to the device based upon version of the potential transaction automatically determined based upon the first opportunity, such that the user does not need to perform various navigation functions and/or open a different application and/or web page to search for and/or find a page for purchasing a desired item and/or such that the user does not need to perform various navigation functions and/or open a different application and/or web page to find discounts and/or lower cost options to purchase the desired item).

Alternatively and/or additionally, implementation of at least some of the disclosed subject matter may lead to benefits including, but not limited to, a reduction in screen space and/or an improved usability of a display (e.g., of the device 500) (e.g., as a result of automatically providing a user-specific transaction interface to the device based upon a user-specific machine learning model tailored to the user, such that the user does not need to perform various navigation functions and/or open a different application and/or web page to search for and/or find content specific to the user (e.g., transaction-related content) when accessing a message).

In some examples, the client device is configured to display a menu listing one or more features (e.g., selectable features) of the application. The one or more features may comprise a message viewing feature and/or a tab viewing feature, for example. In an example, in response to a selection of the message viewing feature, the message viewing feature may provide one or more resources (e.g., data, an interface, etc.) for displaying and/or engaging with a message (such as using one or more of the techniques provided herein). In response to a selection of the tab viewing feature, the tab viewing feature may provide one or more resources (e.g., data, an interface, etc.) for displaying and/or facilitating engagement with messages associated with a category of the tab, such as transactions, shopping, attachments, videos, etc. In some examples, the client device is configured to display (as a user-specific interface, for example) an application summary that can be reached directly from the menu and/or responsive to selecting a notification, wherein the application summary displays a combination of data offered within the one or more features and/or a limited list of data offered within the one or more features. In some examples, each of the data in the limited list of data is selectable to launch the respective feature (of the one or more features) and enable the selected data to be seen within the respective feature. In some examples, the application summary is displayed while the one or more features are in an un-launched and/or unopened state.

In some examples, at least some of the disclosed subject matter may be implemented on a client device, and in some examples, at least some of the disclosed subject matter may be implemented on a server (e.g., hosting a service accessible via a network, such as the Internet). While one or more acts and/or components may be described and/or illustrated herein as being performed and/or implemented on a computing device, such as a client device or on a server, such descriptions and/or illustrations are exemplary, and alternative embodiments may be contemplated in which such acts and/or components are performed and/or implemented on one or more other computing devices. For example, acts and/or components described and/or illustrated in examples herein as being performed and/or implemented on a client device may be performed and/or implemented on one or more servers, and/or acts and/or components described and/or illustrated in examples herein as being performed and/or implemented on a server may be performed and/or implemented on one or more client devices.

Figure 7:
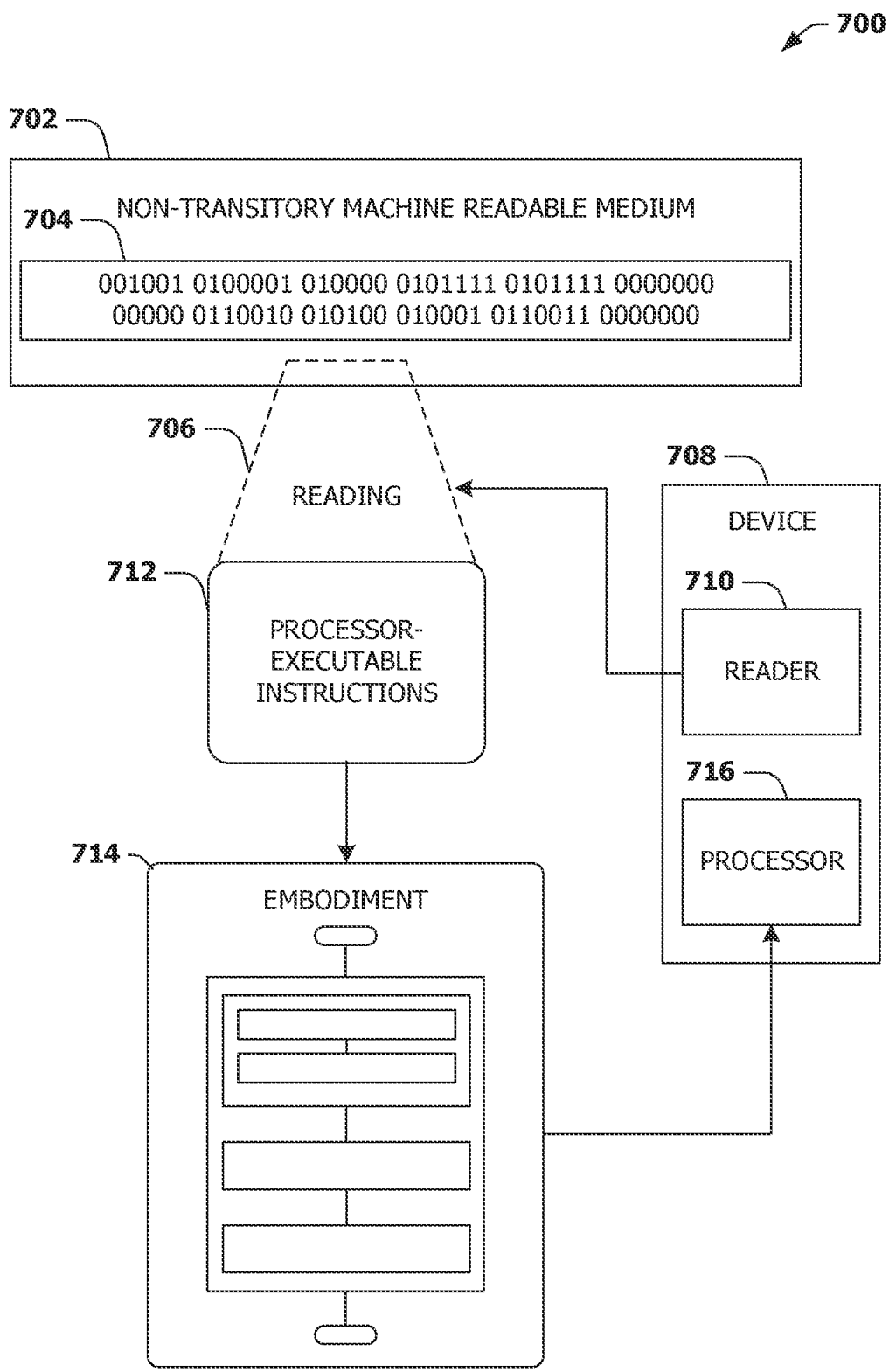
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4 and/or the example method 600 of FIG. 6, for example. In some embodiments, the processor-executable instructions 712 are configured to cause implementation of a system, such as at least some of the exemplary system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

searching a datastore of a user, comprising at least one of an email mailbox or a record of web browsing, for an indication of a potential transaction;

determining, based upon the searching, a completed transaction corresponding to travel from a starting point to a destination;

identifying the potential transaction as further travel in a same journey as the completed transaction corresponding to the travel from the starting point to the destination;

responsive to identifying the potential transaction, searching for an opportunity to modify one or more terms of the potential transaction in at least one of the datastore of the user, a partnership datastore or a network;

identifying the opportunity to modify the one or more terms of the potential transaction;

responsive to identifying the opportunity to modify the one or more terms of the potential transaction, generating a user-specific transaction interface comprising one or more selectable inputs for engaging in a modified version of the potential transaction;

providing, for display on a device of the user, a notification of the modified version of the potential transaction;

receiving an indication of the user selecting the notification of the modified version of the potential transaction; and responsive to the user selecting the notification of the modified version of the potential transaction, providing the user-specific transaction interface for display on the device of the user, wherein the one or more selectable inputs for engaging in the modified version of the potential transaction can be reached from the user-specific transaction interface on the device of the user without the user needing to manually perform one or more navigation functions or open a different application or web page to engage in the modified version of the potential transaction.

2. The method of claim 1, wherein the searching the datastore for the indication of the potential transaction comprises:
determining that a first email in the email mailbox comprises a receipt for a completed transaction;
determining that the completed transaction is associated with a journey; and
identifying the potential transaction as a part of the journey.

3. The method of claim 1, wherein the searching the datastore for the indication of the potential transaction comprises:
determining that a first record in the record of web browsing is indicative of an incomplete transaction; and
determining the potential transaction based upon the incomplete transaction.

4. The method of claim 1, wherein the searching for the opportunity to modify the one or more terms of the potential transaction comprises:
determining that a first email in the email mailbox comprises a coupon associated with the potential transaction; and
determining the modified version of the potential transaction based upon the coupon and the potential transaction.

5. The method of claim 1, wherein the searching for the opportunity to modify the one or more terms of the potential transaction comprises:
determining that a first partnership contract in the partnership datastore comprises a modification term associated with the potential transaction; and
determining the modified version of the potential transaction based upon the modification term and the potential transaction.

6. The method of claim 1, wherein the searching for the opportunity to modify the one or more terms of the potential transaction comprises:
determining that a first search result of a query of the network comprises a coupon associated with the potential transaction; and
determining the modified version of the potential transaction based upon the coupon and the potential transaction.

7. The method of claim 1, wherein the searching for the opportunity to modify the one or more terms of the potential transaction comprises:
transmitting, over the network, an offer request;
receiving, responsive to the offer request, an offer associated with the potential transaction; and
determining the modified version of the potential transaction based upon the offer and the potential transaction.

8. The method of claim 1, wherein the generating the user-specific transaction interface comprises:

determining, based upon a trained user-specific machine learning model, a user interest associated with the potential transaction; and
using the user interest to create the user-specific transaction interface.

9. The method of claim 1, comprising:
in response to the user selecting a selectable input of the one or more selectable inputs, executing the modified version of the potential transaction.

10. A computing device comprising:
a processor; and
memory comprising processor-executable instructions that when executed by the processor cause performance of operations, the operations comprising:
searching a datastore of a user, comprising at least one of an email mailbox or a record of web browsing, for an indication of a potential transaction;
determining, based upon the searching, a completed transaction corresponding to travel from a starting point to a destination;
identifying the potential transaction as further travel in a same journey as the completed transaction corresponding to the travel from the starting point to the destination;
responsive to identifying the potential transaction, searching for an opportunity associated with the potential transaction in at least one of the datastore of the user, a partnership datastore or a network;
identifying the opportunity associated with the potential transaction;
responsive to identifying the opportunity associated with the potential transaction, generating a user-specific transaction interface comprising one or more selectable inputs for engaging in a version of the potential transaction; and
providing the user-specific transaction interface for display on a device of the user, wherein the one or more selectable inputs for engaging in the version of the potential transaction can be reached from the user-specific transaction interface on the device of the user without the user needing to manually perform one or more navigation functions or open a different application or web page to engage in the version of the potential transaction.

11. The computing device of claim 10, wherein:
the searching the datastore for the indication of the potential transaction comprises determining that a first email in the email mailbox comprises a receipt for a completed transaction; and
the operations comprises:
in response to the user selecting a selectable input of the one or more selectable inputs:
canceling the completed transaction; and
executing the version of the potential transaction.

12. The computing device of claim 10, wherein the searching the datastore for the indication of the potential transaction comprises:
determining that a first email in the email mailbox comprises a receipt for a completed transaction;
determining that the completed transaction is associated with a journey; and
identifying the potential transaction as a part of the journey.

13. The computing device of claim 10, wherein the searching the datastore for the indication of the potential transaction comprises:

determining that a first record in the record of web browsing is indicative of an incomplete transaction; and determining the potential transaction based upon the incomplete transaction.

14. The computing device of claim 10, wherein the searching for the opportunity associated with the potential transaction comprises:

determining that a first email in the email mailbox comprises a coupon associated with the potential transaction; and determining the version of the potential transaction based upon the coupon.

15. The computing device of claim 10, wherein the searching for the opportunity associated with the potential transaction comprises:

determining that a first partnership contract in the partnership datastore comprises a term associated with the potential transaction; and determining the version of the potential transaction based upon the term.

16. The computing device of claim 10, wherein the searching for the opportunity associated with the potential transaction comprises:

determining that a first search result of a query of the network comprises a coupon associated with the potential transaction; and determining the version of the potential transaction based upon the coupon.

17. The computing device of claim 10, wherein the searching for the opportunity associated with the potential transaction comprises:

transmitting, over the network, an offer request;

receiving, responsive to the offer request, an offer associated with the potential transaction; and determining the version of the potential transaction based upon the offer and the potential transaction.

18. The computing device of claim 10, wherein the generating the user-specific transaction interface comprises:

determining, based upon a trained user-specific machine learning model, a user interest associated with the potential transaction; and using the user interest to create the user-specific transaction interface.

19. The computing device of claim 10, the operations comprising:

receiving, from the device of the user, a selection of a selectable input of the one or more selectable inputs; and in response to receiving the selection of the selectable input, executing the version of the potential transaction.

20. A non-transitory machine readable medium having stored thereon processor-executable instructions that when executed cause performance of operations, the operations comprising:

searching a datastore of a user, comprising at least one of an email mailbox or a record of web browsing, for an indication of a potential transaction;

determining, based upon the searching, a completed transaction corresponding to travel from a starting point to a destination;

identifying the potential transaction as further travel in a same journey as the completed transaction corresponding to the travel from the starting point to the destination;

responsive to identifying the potential transaction, searching for an opportunity to modify one or more terms of the potential transaction in at least one of the datastore of the user, a partnership datastore or a network;

identifying the opportunity to modify the one or more terms of the potential transaction;

responsive to identifying the opportunity to modify the one or more terms of the potential transaction, generating a user-specific transaction interface; and providing the user-specific transaction interface for display on a device of the user, wherein one or more selectable inputs can be reached from the user-specific transaction interface on the device of the user without the user needing to manually perform one or more navigation functions or open a different application or web page.

* * * * *